United States Patent
Leser et al.

(10) Patent No.: US 10,654,643 B2
(45) Date of Patent: May 19, 2020

(54) INSULATED SLEEVE FOR A CONTAINER

(71) Applicant: Berry Plastics Corporation, Evansville, IN (US)

(72) Inventors: Chris K. Leser, Mahomet, IL (US); Charles T. Wallace, Evansville, IN (US); Philip A. Driskill, Newburgh, IN (US); John B. Euler, Evansville, IN (US); Jason J. Paladino, Newburgh, IN (US); Milan C. Maravich, Newburgh, IN (US); Daniel O. Davis, Cynthiana, IN (US); Jeffrey A. Mann, Evansville, IN (US); Randy A. Bowlds, Evansville, IN (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

(21) Appl. No.: 16/430,652

(22) Filed: Jun. 4, 2019

(65) Prior Publication Data

US 2019/0283954 A1      Sep. 19, 2019

Related U.S. Application Data

(63) Continuation of application No. 15/672,668, filed on Aug. 9, 2017, now Pat. No. 10,351,332, which is a
(Continued)

(51) Int. Cl.
| | | |
|---|---|---|
| *B65D 81/38* | (2006.01) | |
| *B32B 1/02* | (2006.01) | |
| *B32B 1/08* | (2006.01) | |
| *B32B 27/08* | (2006.01) | |
| *B32B 1/00* | (2006.01) | |
| *B32B 27/32* | (2006.01) | |
| *B29C 65/00* | (2006.01) | |
| *A47G 19/22* | (2006.01) | |
| *B31B 100/00* | (2017.01) | |

(Continued)

(52) U.S. Cl.
CPC ..... *B65D 81/3879* (2013.01); *A47G 19/2205* (2013.01); *B29C 66/1122* (2013.01); *B29C 66/1282* (2013.01); *B29C 66/12881* (2013.01); *B29C 66/14* (2013.01); *B29C 66/4322* (2013.01); *B29C 66/727* (2013.01); *B29C 66/7234* (2013.01); *B32B 1/00* (2013.01); *B32B 1/02* (2013.01); *B32B 1/08* (2013.01); *B32B 27/08* (2013.01); *B32B 27/32* (2013.01); *B65D 81/38* (2013.01); *B65D 81/3865* (2013.01); *B65D 81/3867* (2013.01); *B65D 81/3869* (2013.01); *B65D 81/3874* (2013.01); *B65D 81/3876* (2013.01); *B65D 81/3881* (2013.01); *B29C 65/02* (2013.01); *B29C 66/71* (2013.01); *B29C 66/73713* (2013.01); *B29L 2031/7132* (2013.01); *B31B 2100/00* (2017.08); *B31B 2100/0022* (2017.08); *B31B 2105/00* (2017.08); *B31B 2105/0022* (2017.08); *B31B 2110/10* (2017.08); *B31B 2110/20* (2017.08); *Y10T 428/139* (2015.01); *Y10T 428/1352* (2015.01); *Y10T 428/1376* (2015.01); *Y10T 428/1393* (2015.01)

(58) Field of Classification Search
CPC ............... B65D 81/38; B65D 81/3865; B65D 81/3867; B65D 81/3869; B65D 81/3874; B32B 1/02; B32B 1/08; Y10T 428/1376; Y10T 428/139; Y10T 428/1393
See application file for complete search history.

*Primary Examiner* — Walter Aughenbaugh
(74) *Attorney, Agent, or Firm* — Barnes & Thornburg LLP

(57) ABSTRACT

A container includes a cup formed to include and interior region and an insulated sleeve. The insulated sleeve is coupled to an outer surface of the cup.

20 Claims, 21 Drawing Sheets

Related U.S. Application Data continuation of application No. 15/137,657, filed on Apr. 25, 2016, now Pat. No. 9,758,293, which is a continuation of application No. 13/526,417, filed on Jun. 18, 2012, now Pat. No. 9,102,461, which is a continuation of application No. 14/755,546, filed on Jun. 30, 2015, now Pat. No. 9,346,605.

(60) Provisional application No. 61/498,415, filed on Jun. 17, 2011, provisional application No. 61/618,637, filed on Mar. 30, 2012.

(51) Int. Cl.
*B31B 105/00* (2017.01)
*B31B 110/10* (2017.01)
*B31B 110/20* (2017.01)
*B29L 31/00* (2006.01)
*B29C 65/02* (2006.01)

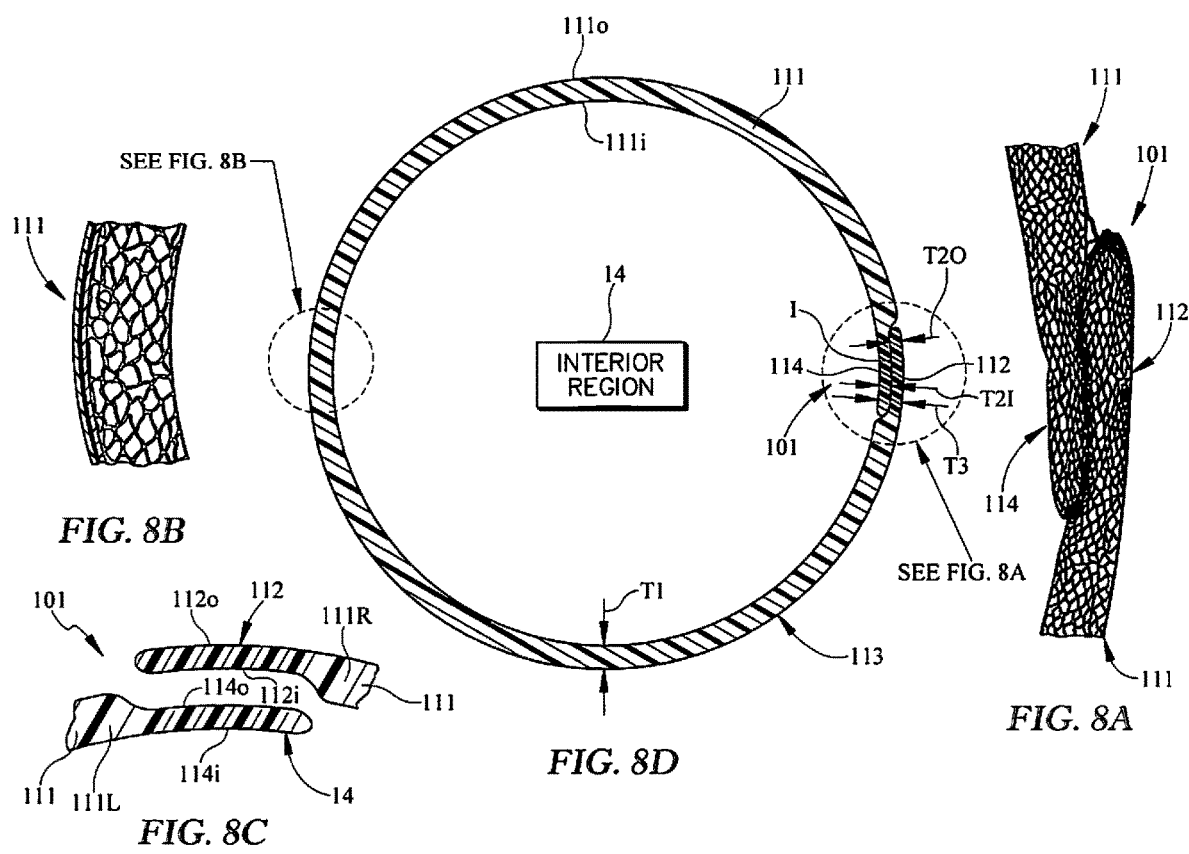

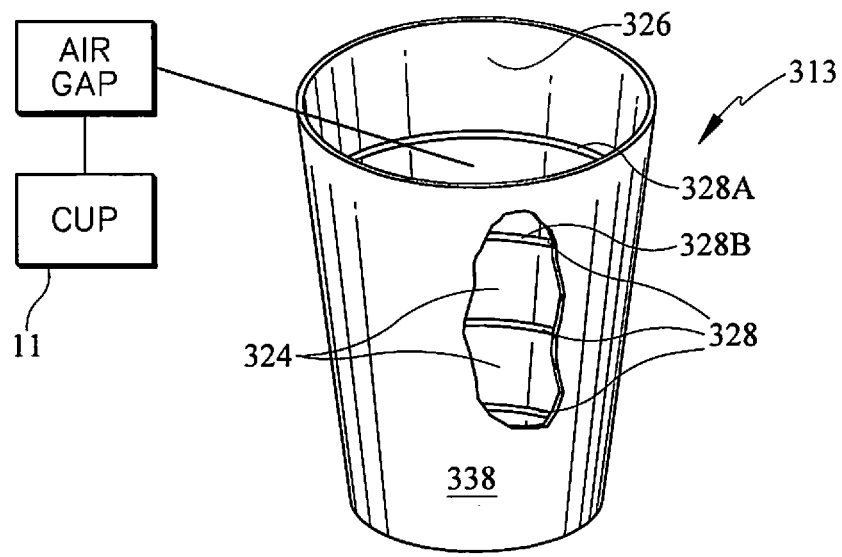
FIG. 11
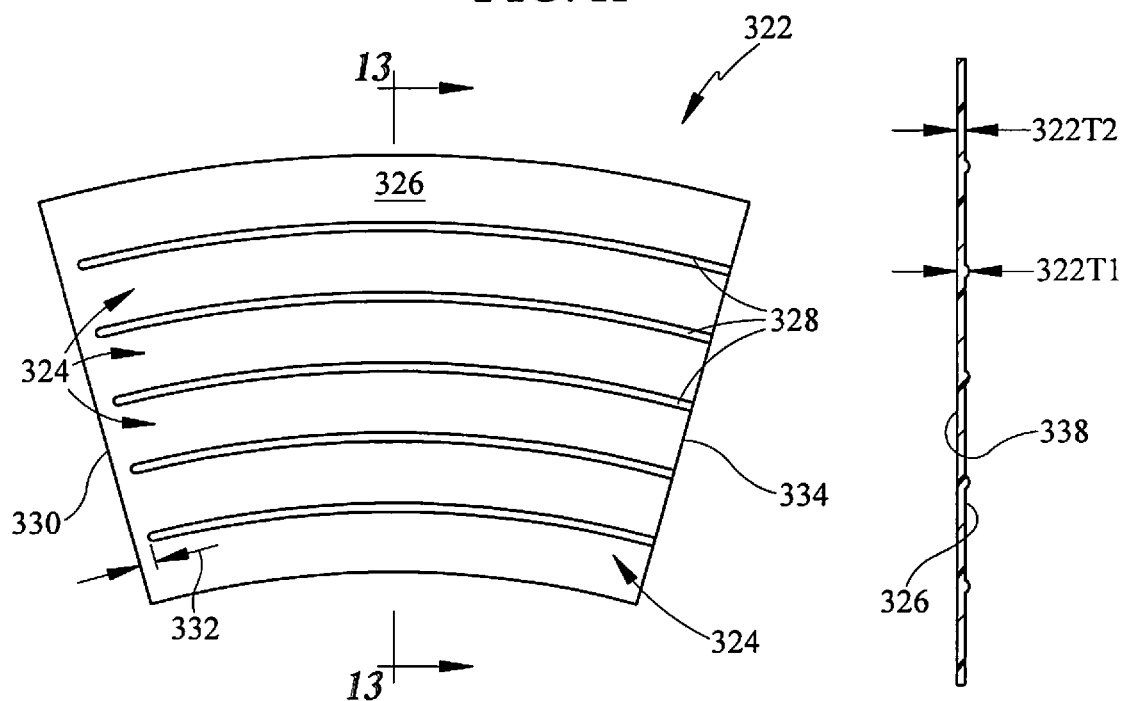
FIG. 12
FIG. 13

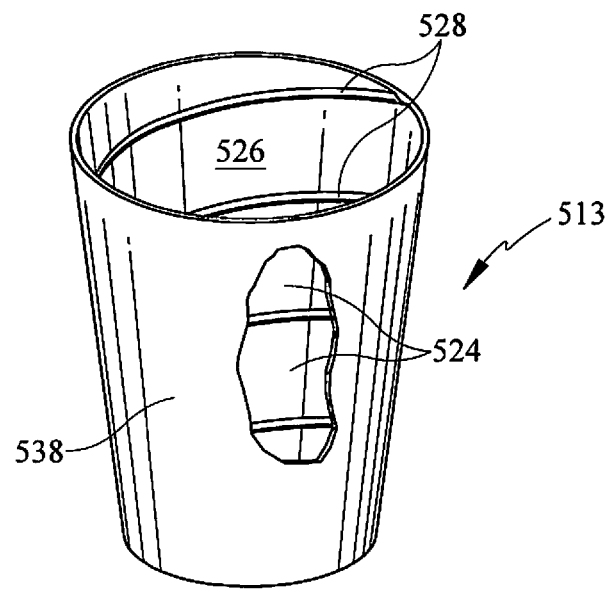
FIG. 17
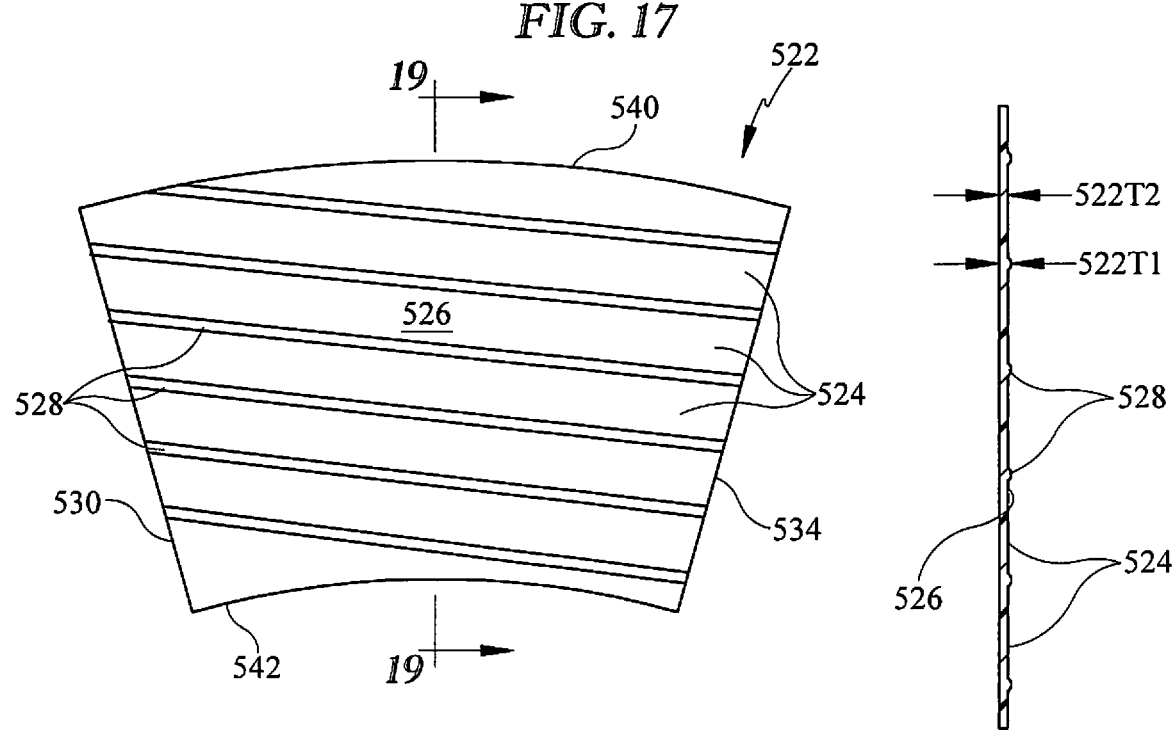
FIG. 18
FIG. 19

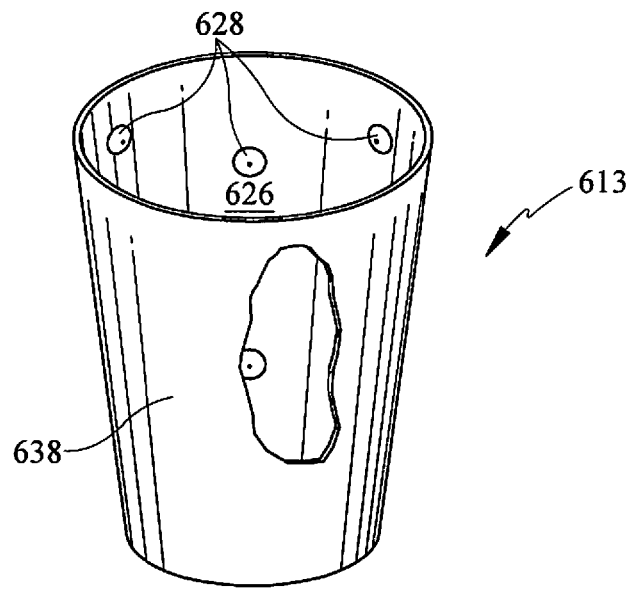
FIG. 20
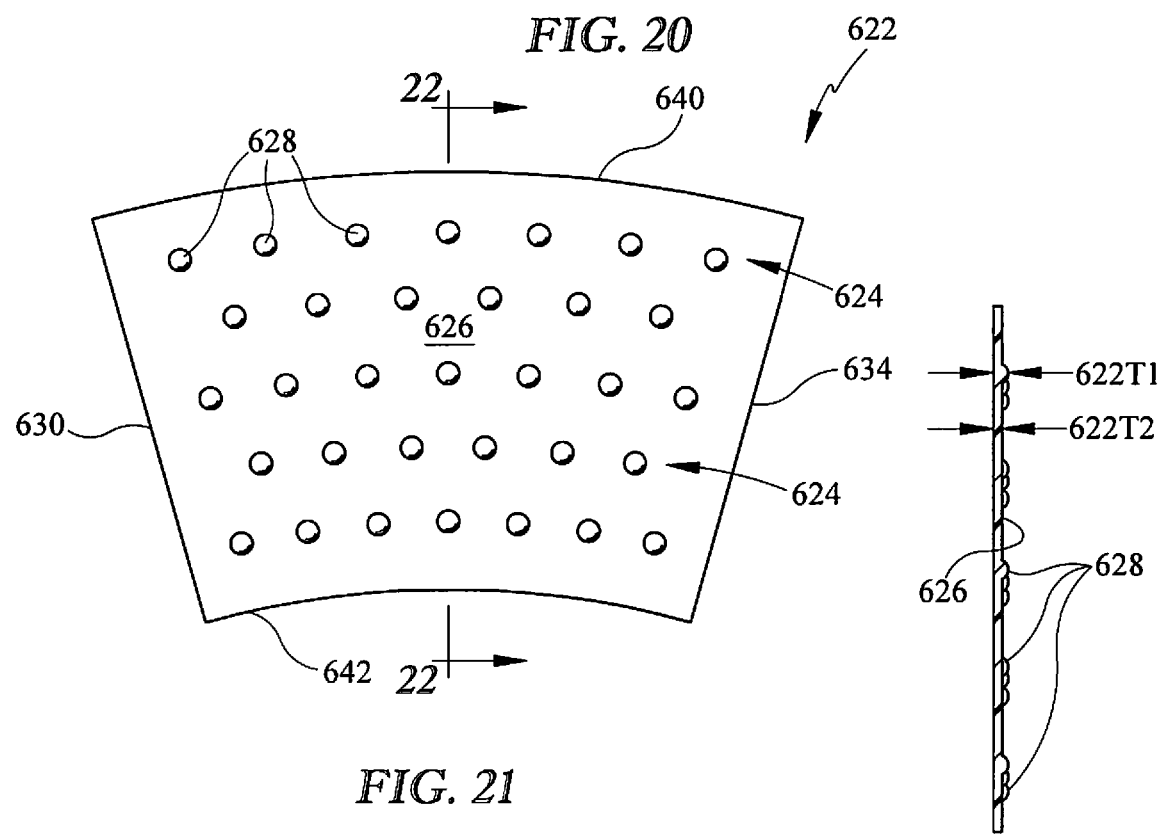
FIG. 21
FIG. 22

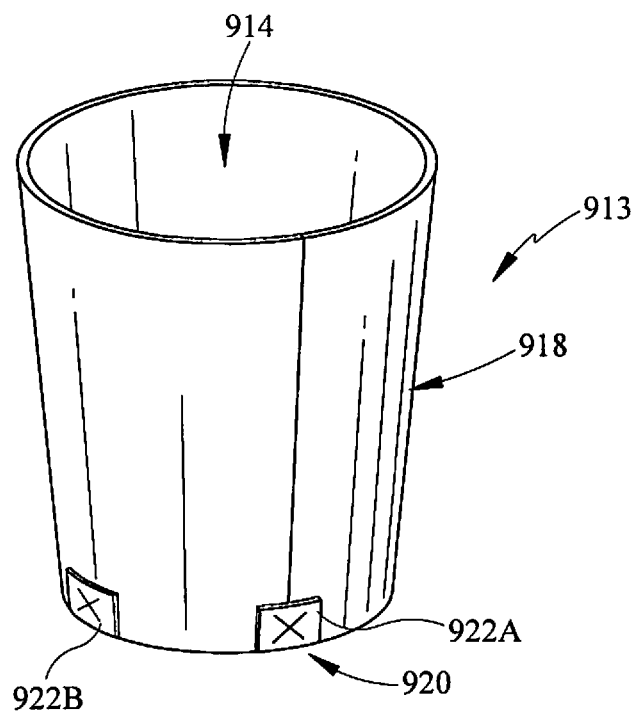
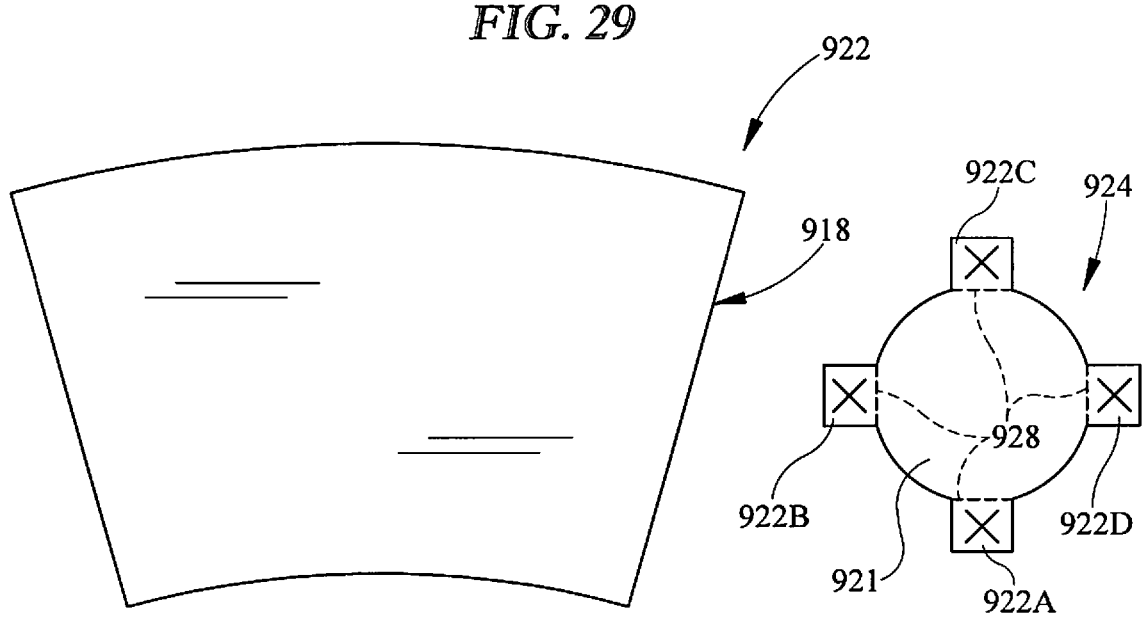
FIG. 29
FIG. 30
FIG. 31

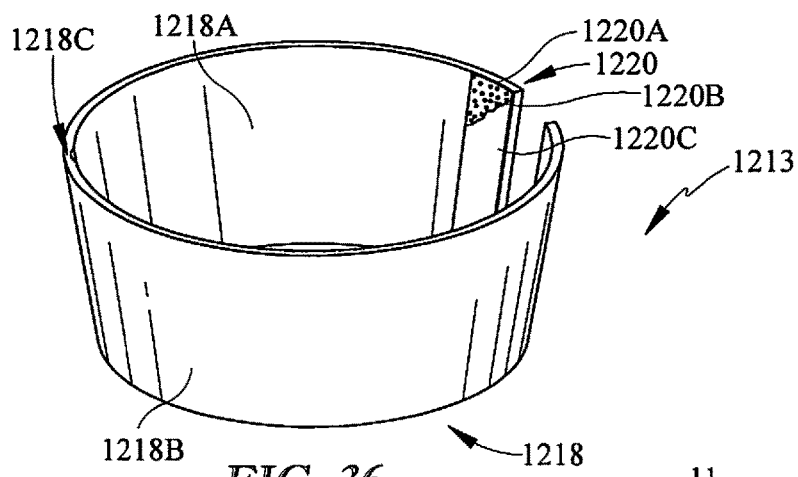
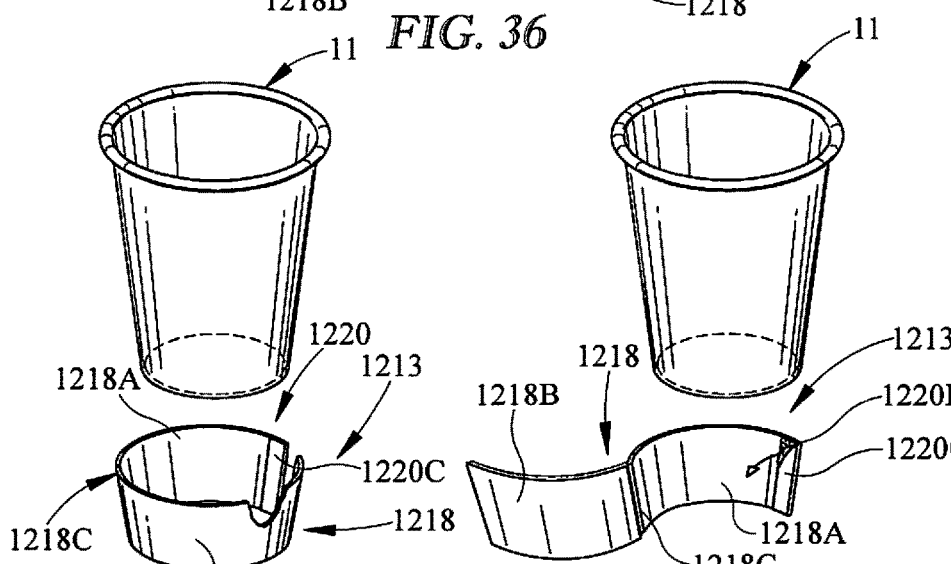
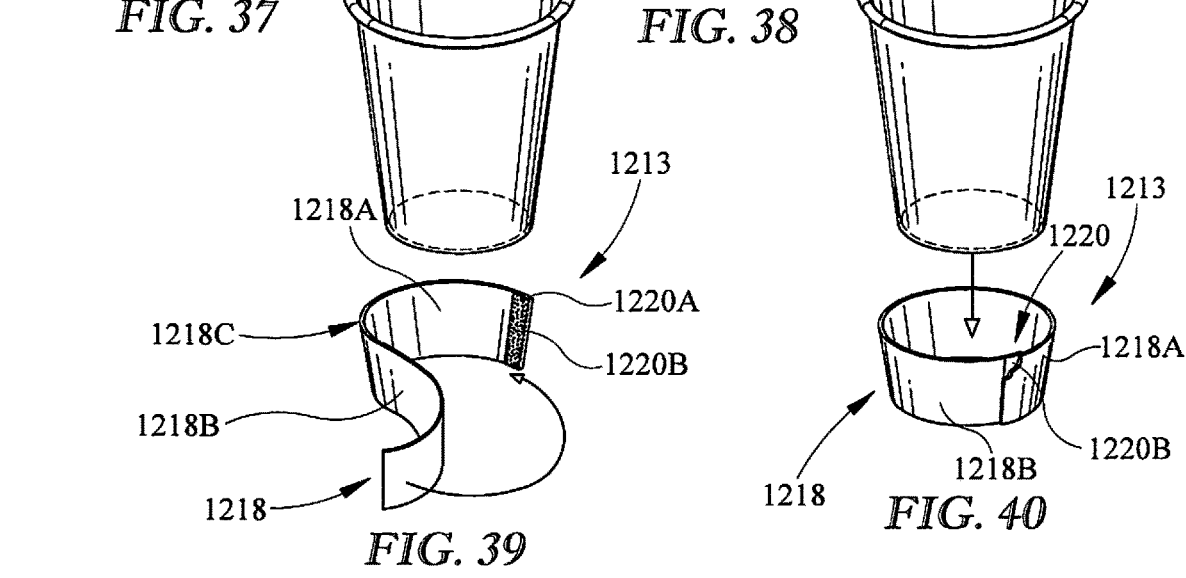
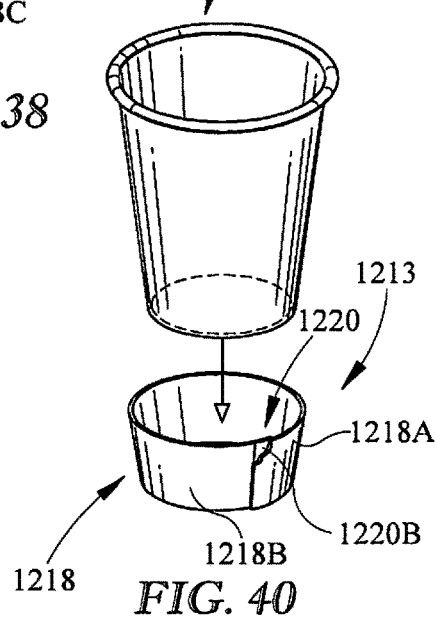

INSULATED SLEEVE FOR A CONTAINER

PRIORITY CLAIM

This application is a continuation of U.S. application Ser. No. 15/672,668, filed Aug. 9, 2017, which is a continuation of U.S. application Ser. No. 15/137,657, filed Apr. 25, 2016, which is a continuation of U.S. application Ser. No. 14/755,546, filed Jun. 30, 2015, which is a continuation of U.S. application Ser. No. 13/526,417, filed Jun. 18, 2012, which claims priority under 35 U.S.C. § 119(e) to U.S. Provisional Application No. 61/498,415, filed Jun. 17, 2011 and No. 61/618,637, filed Mar. 30, 2012, each of which are expressly incorporated by reference herein.

BACKGROUND

The present disclosure relates to containers, such as cups, and particularly to thermoformed containers. More particularly, the present disclosure relates to insulated sleeves for cups.

SUMMARY

A vessel in accordance with the present disclosure is configured to hold a product in an interior region formed in the container. In illustrative embodiments, the container is a cup.

In illustrative embodiments, an insulative container includes a cup and an insulative sleeve. The insulative sleeve is coupled to an exterior surface of the cup to insulate a consumer holding the cup from hot or cold temperatures associated with materials or beverages stored in the cup.

In illustrative embodiments, the insulative sleeve is made of a sheet comprising an insulative cellular non-aromatic polymeric material. In some embodiments of the present disclosure, the sheet includes a strip of insulative cellular non-aromatic polymeric material and a skin coupled to the strip and configured to display artwork and text. In other embodiments of the present disclosure, such text and artwork are printed directly on an exterior surface of the strip of insulative cellular non-aromatic polymeric material. In illustrative embodiments, the floor also comprises insulative cellular non-aromatic polymeric material.

In illustrative embodiments, the insulative sleeve is arranged to surround and embrace an exterior surface of a hot-beverage drink cup to provide a grippable low-temperature thermal barrier that can be gripped by a consumer. The sleeve comprises a sheet comprising insulative cellular non-aromatic polymeric material configured to provide means for enabling localized plastic deformation in the sheet to provide a plastically deformed first material segment having a first density located in a first portion of the sheet and a second material segment having a second density lower than the first density located in an adjacent second portion of the sheet without fracturing the insulative cellular non-aromatic polymeric material so that a predetermined insulative characteristic is maintained in the sheet.

The insulative cellular non-aromatic polymeric material included in the insulative sleeve is configured in accordance with the present disclosure to provide means for enabling localized plastic deformation in the insulative sleeve to provide (1) a plastically deformed first material segment having a first density in a first portion of the insulative sleeve and (2) a second material segment having a relatively lower second density in an adjacent second portion of the insulative sleeve. In illustrative embodiments, the more dense first material segment is thinner than the second material segment.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 1:
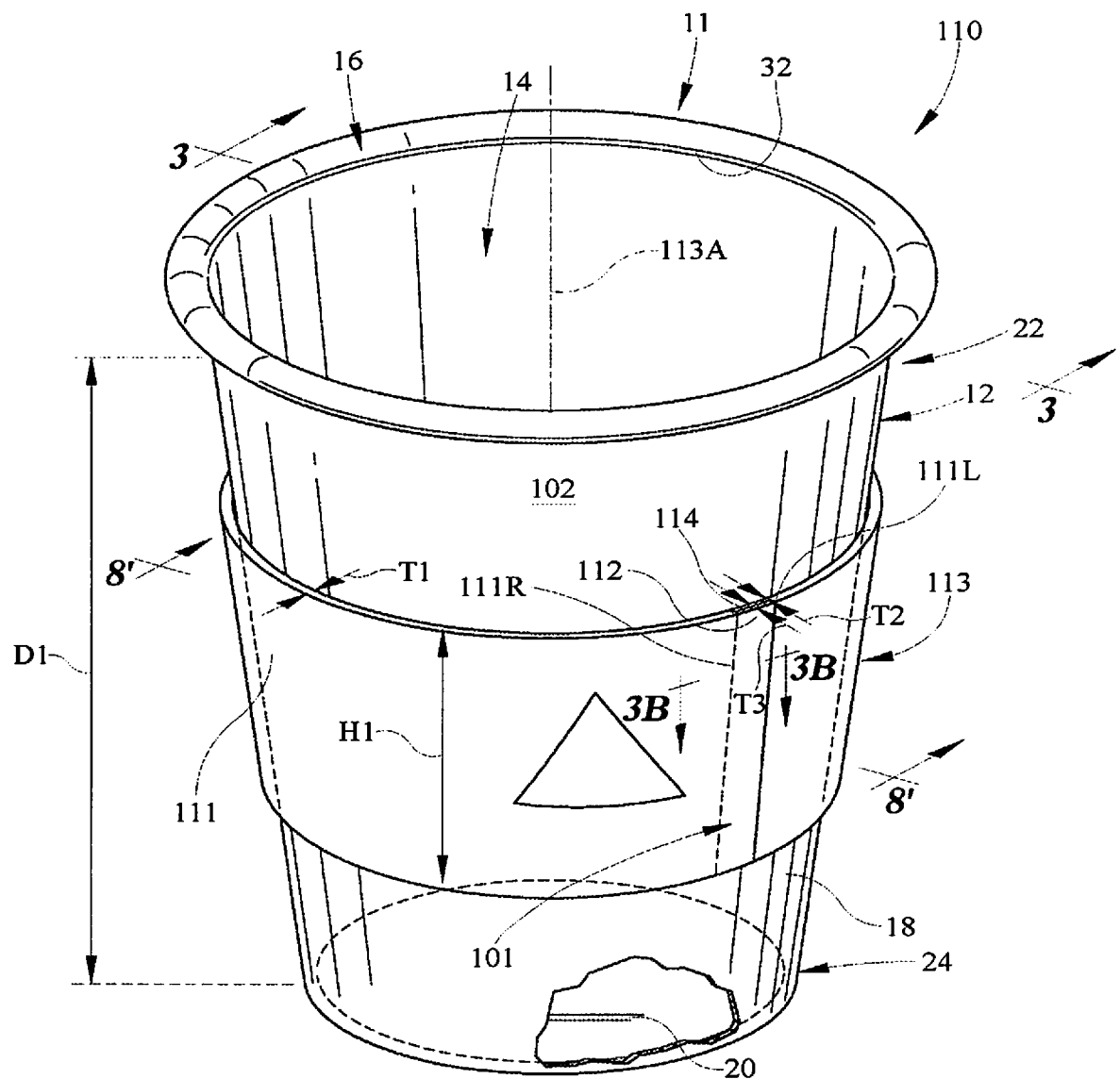
FIG. 1 is a perspective view of a first embodiment of an insulative container in accordance with the present disclosure showing that the insulative container includes a cup including a rolled brim and a base including a sleeve-shaped side wall and a floor and an insulative sleeve coupled to exterior surface of the side wall to extend around the side wall of the cup.
Figures 3, 3A:
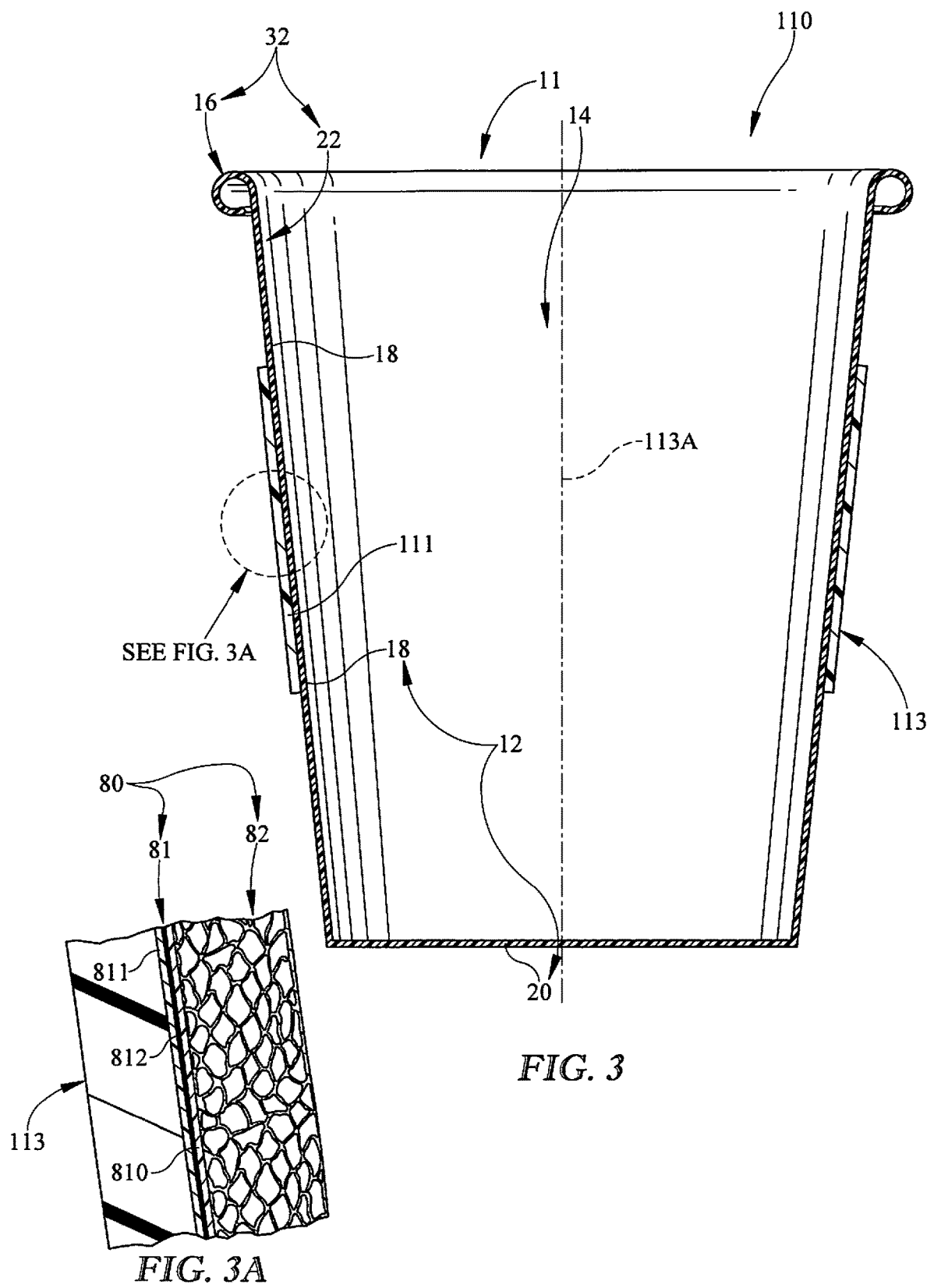
FIG. 3 is a sectional view taken along line 3-3 of FIG. 1 showing that the insulative sleeve is coupled to the side wall included in the base of the cup and positioned to lie between and in spaced-apart relation from each of the rolled brim and the floor.
FIG. 3A is an enlarged sectional view of a portion of the side wall included in the body of the insulative cup of FIG. 3 and a portion of the insulative sleeve and showing that the side wall is made from a sheet that includes, from left to right, a skin including a film, an ink layer, and an adhesive layer, and a strip of insulative cellular non-aromatic polymer material.
Figure 3B:
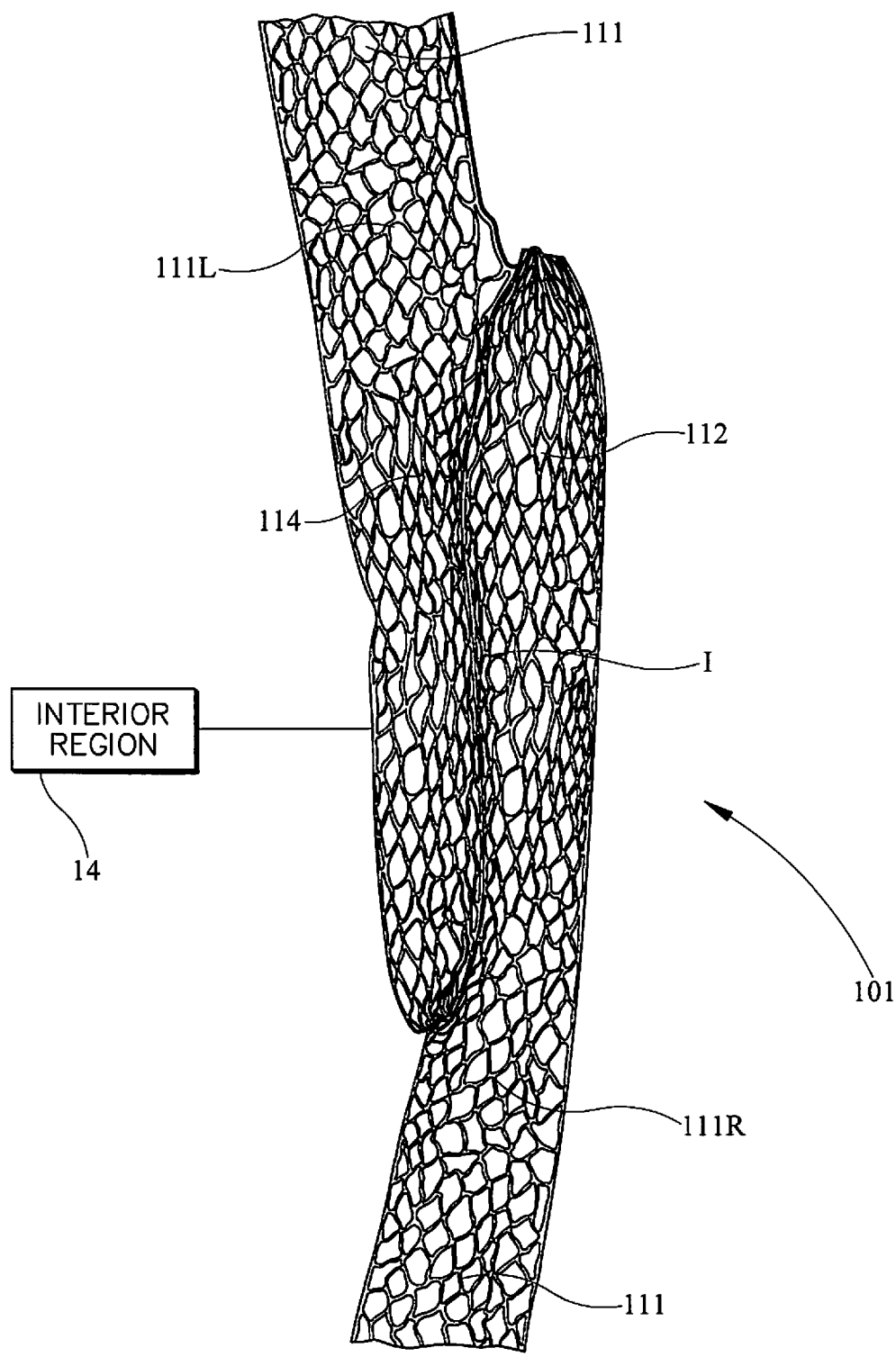
Figure 4:
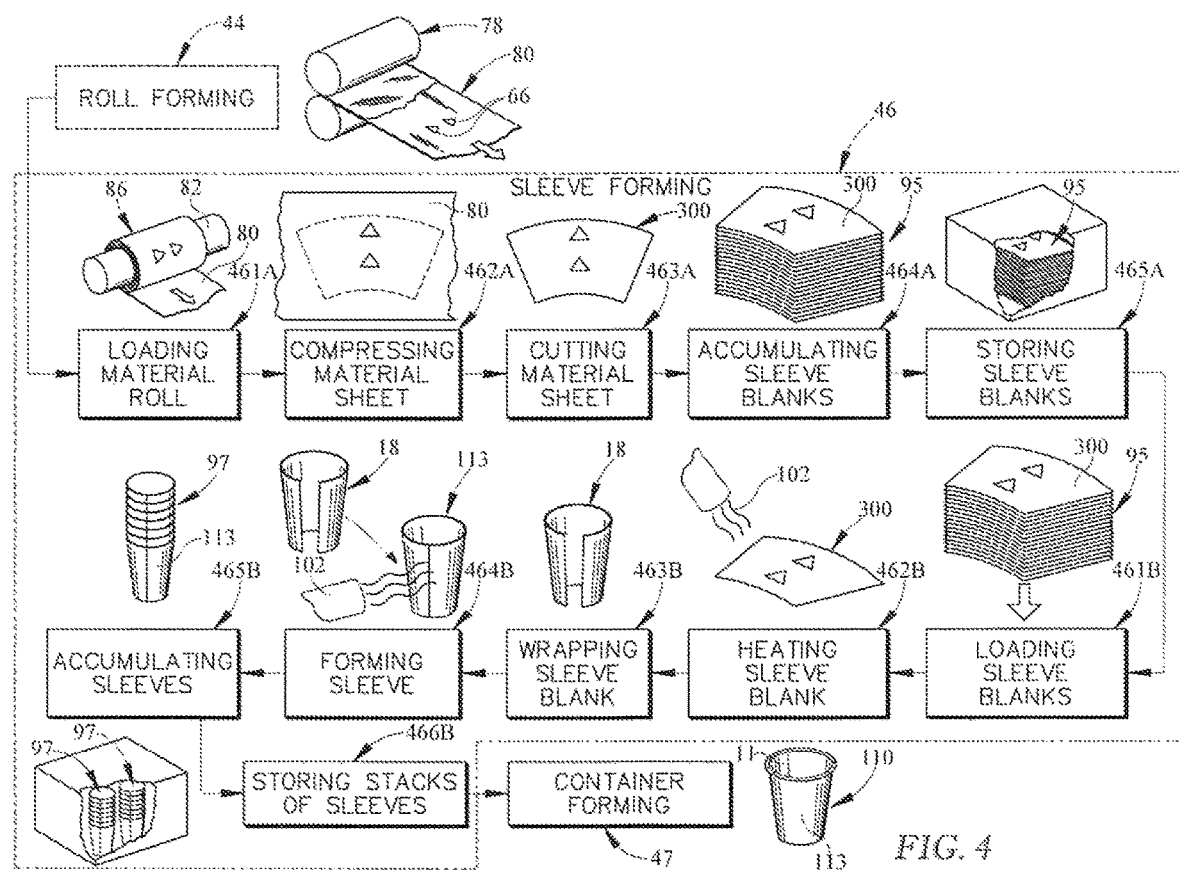
Figure 5:
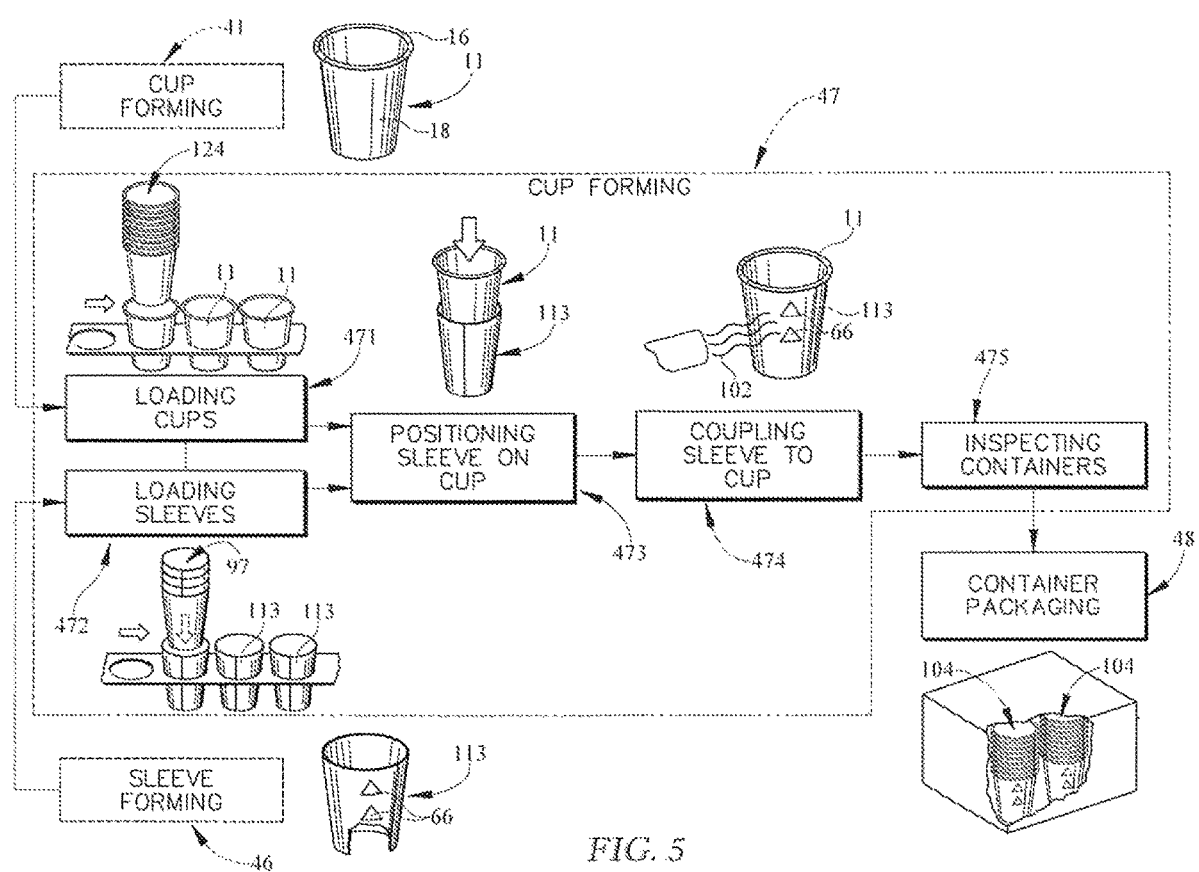
Figure 6:
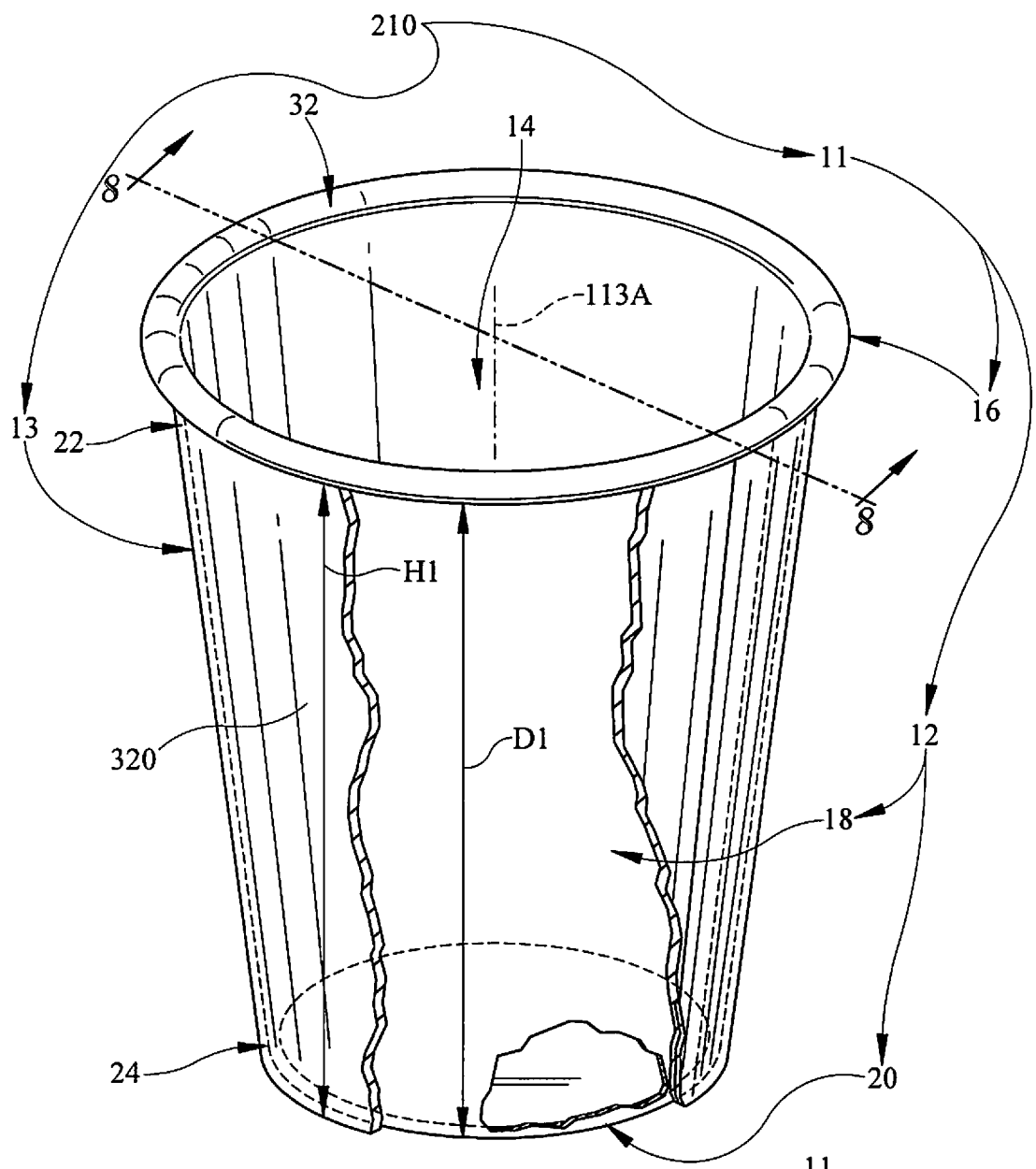
Figure 7:
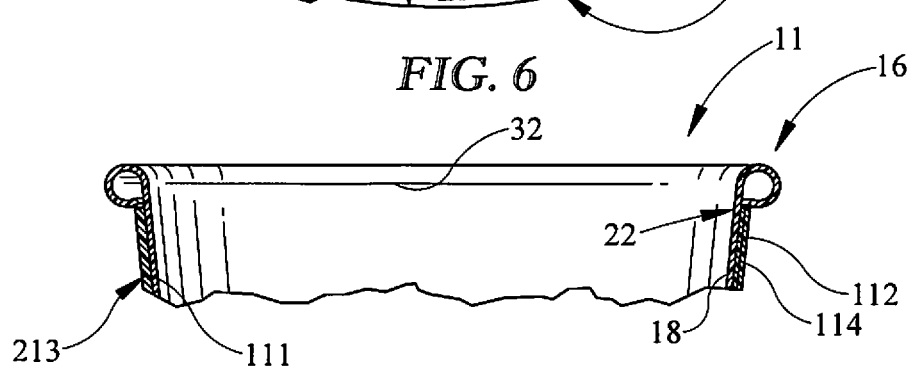
Figure 8:
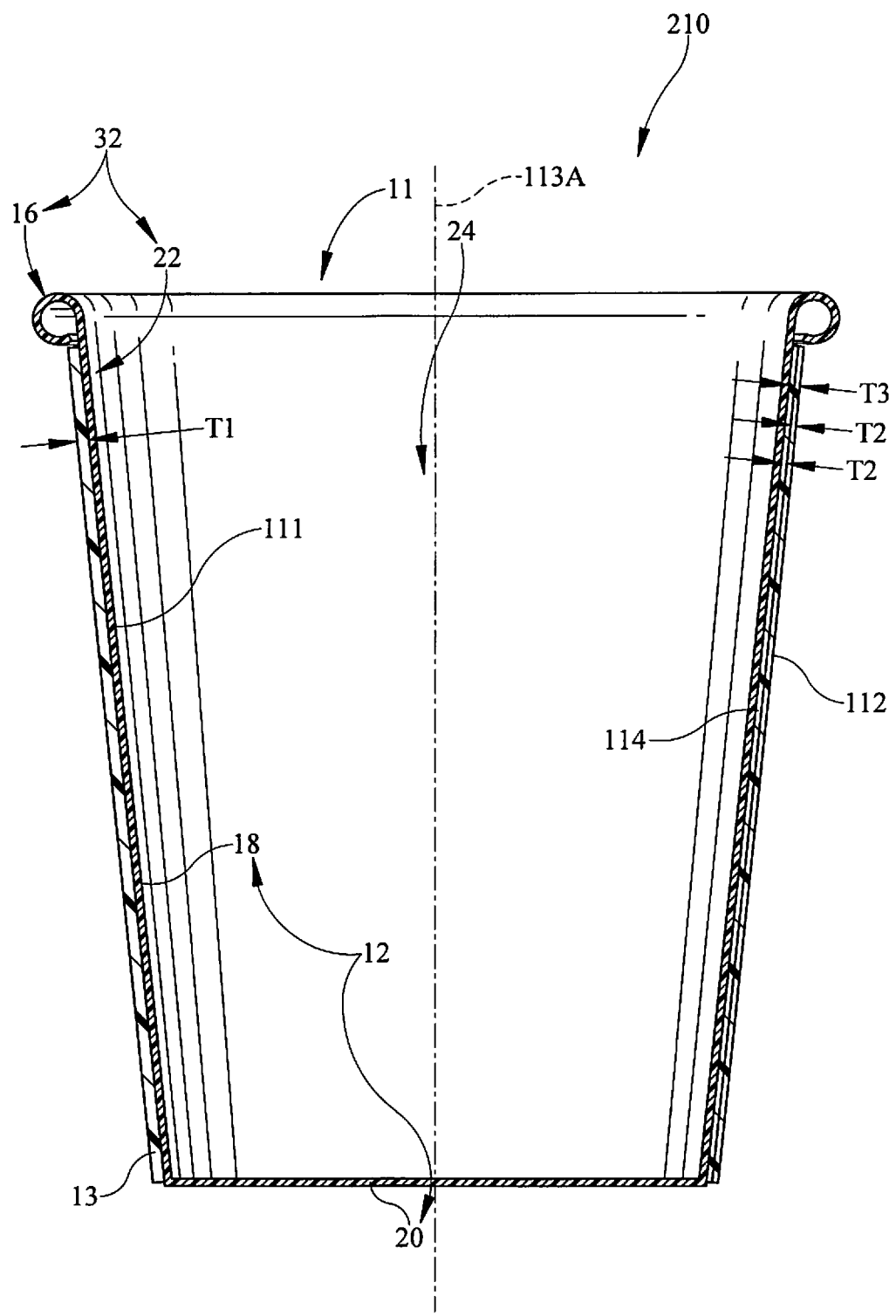
Figure 9:
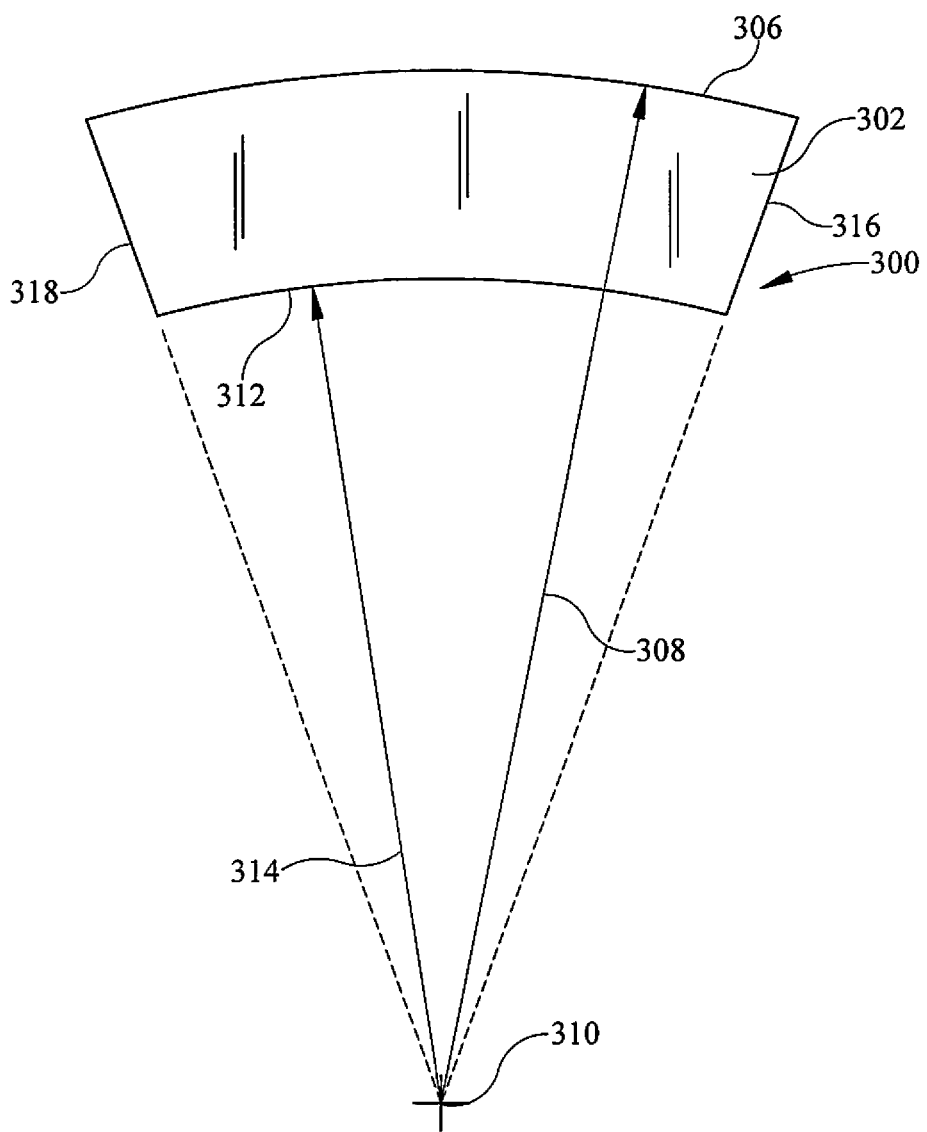
Figure 10:
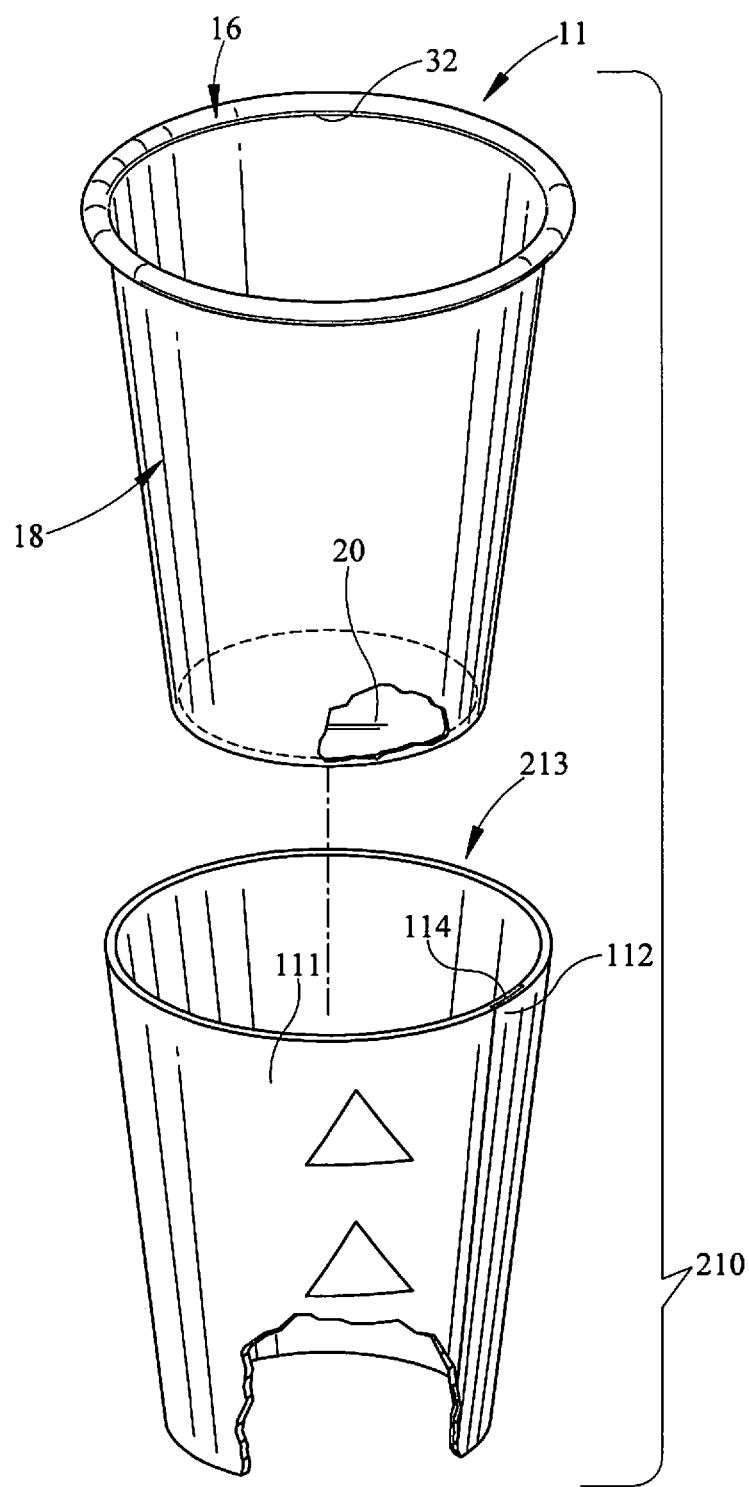
Figure 14:
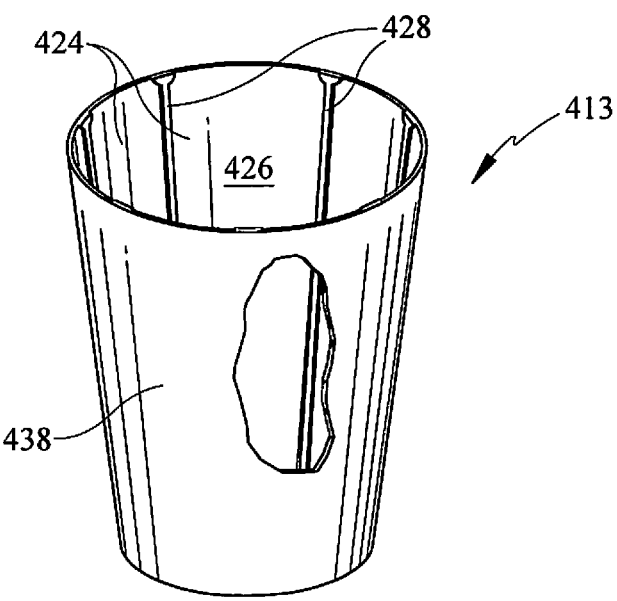
Figure 15:
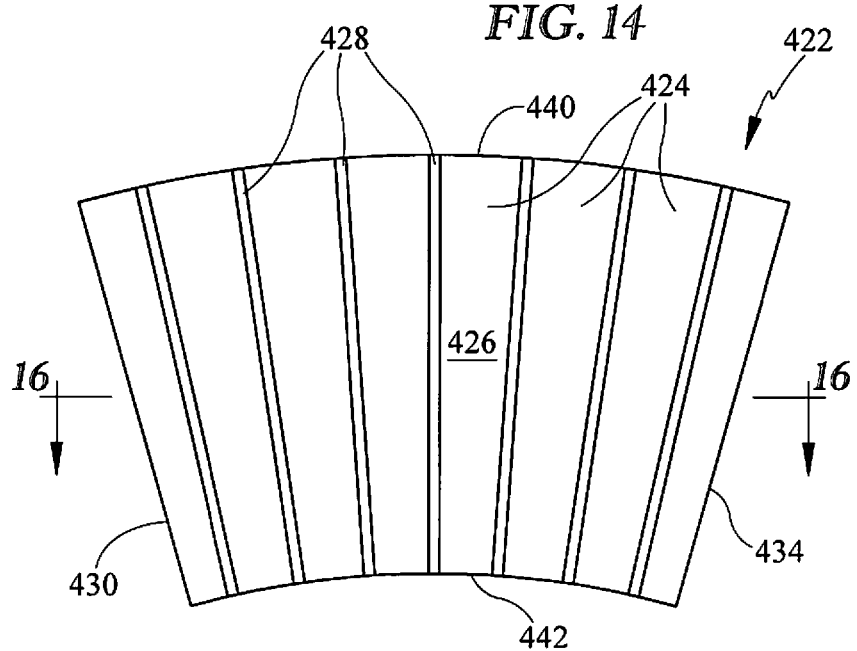
Figure 16:
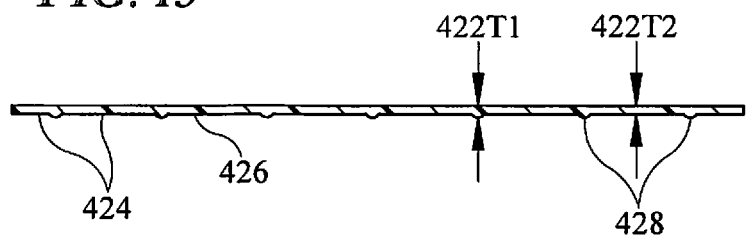
Figure 23:
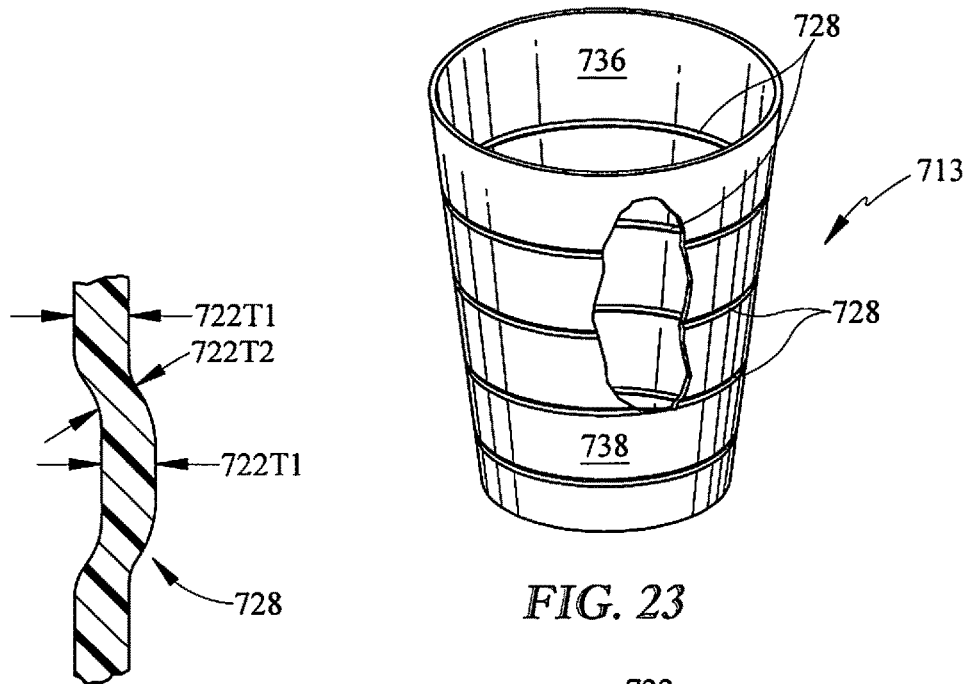
Figure 26:
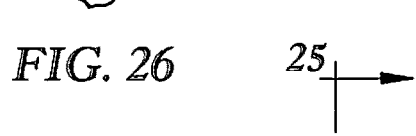
Figure 24:
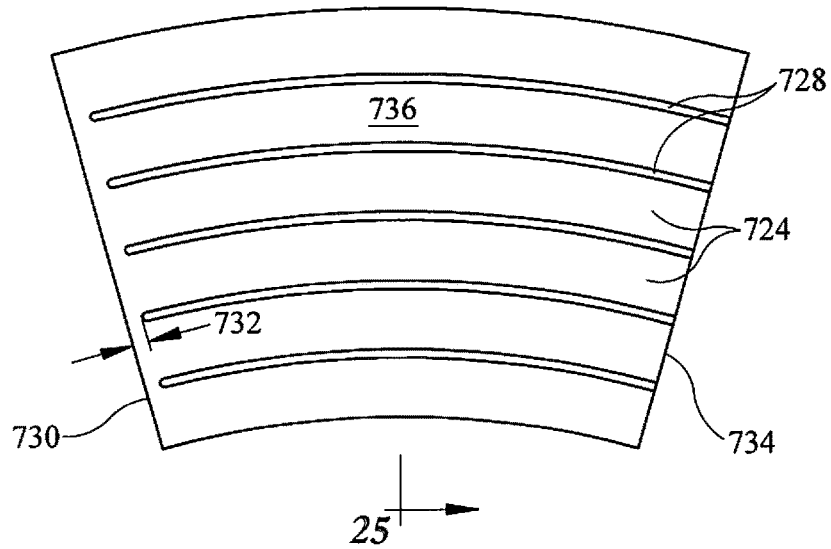
Figure 25:
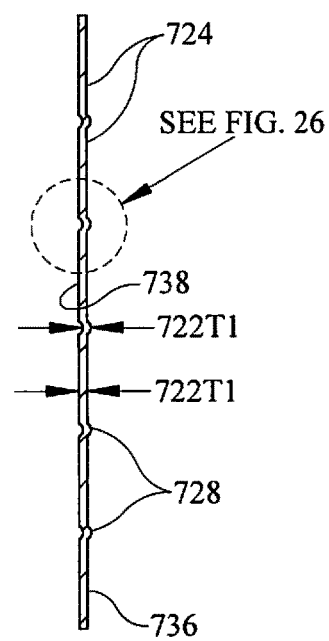
Figure 27:
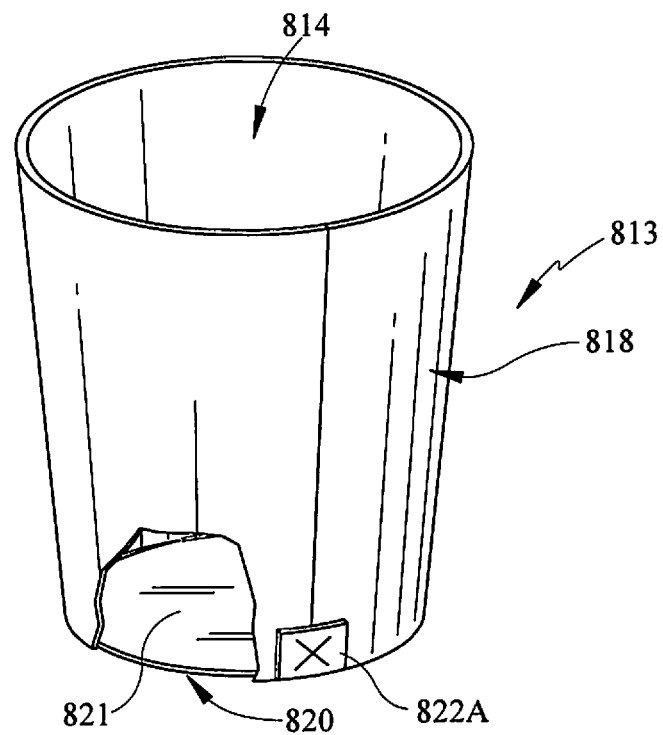
Figure 28:
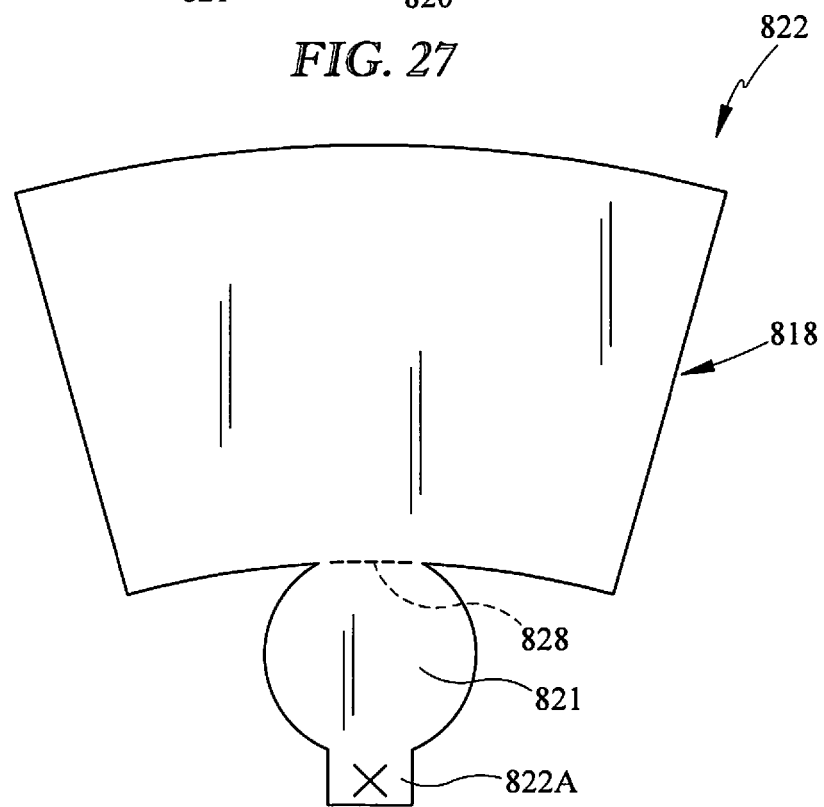
Figure 32:
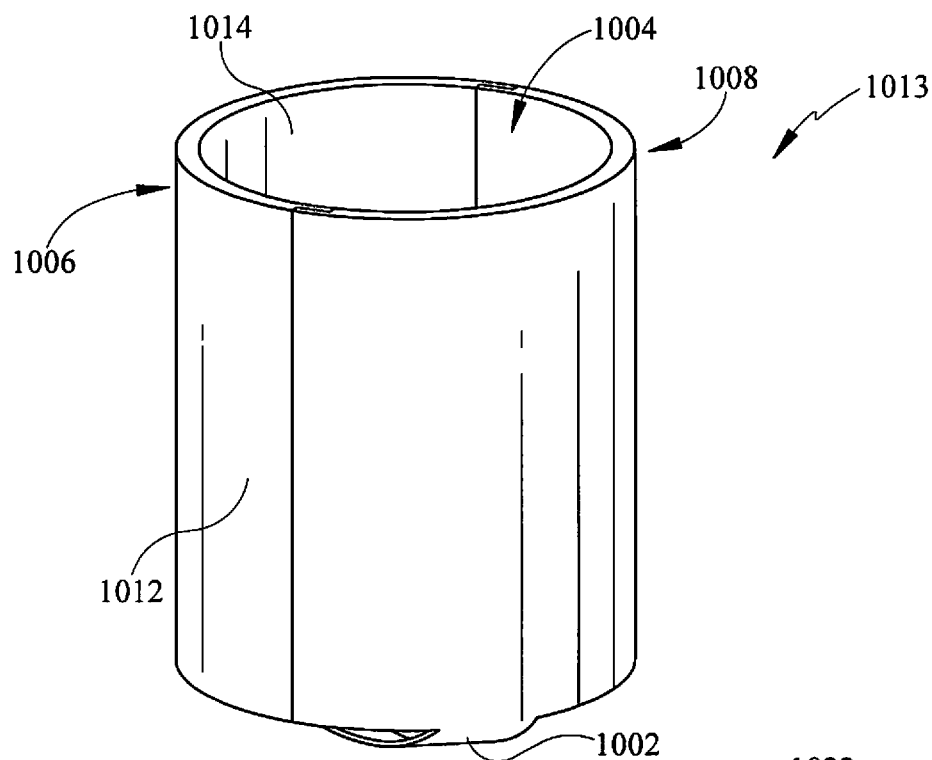
Figure 33:
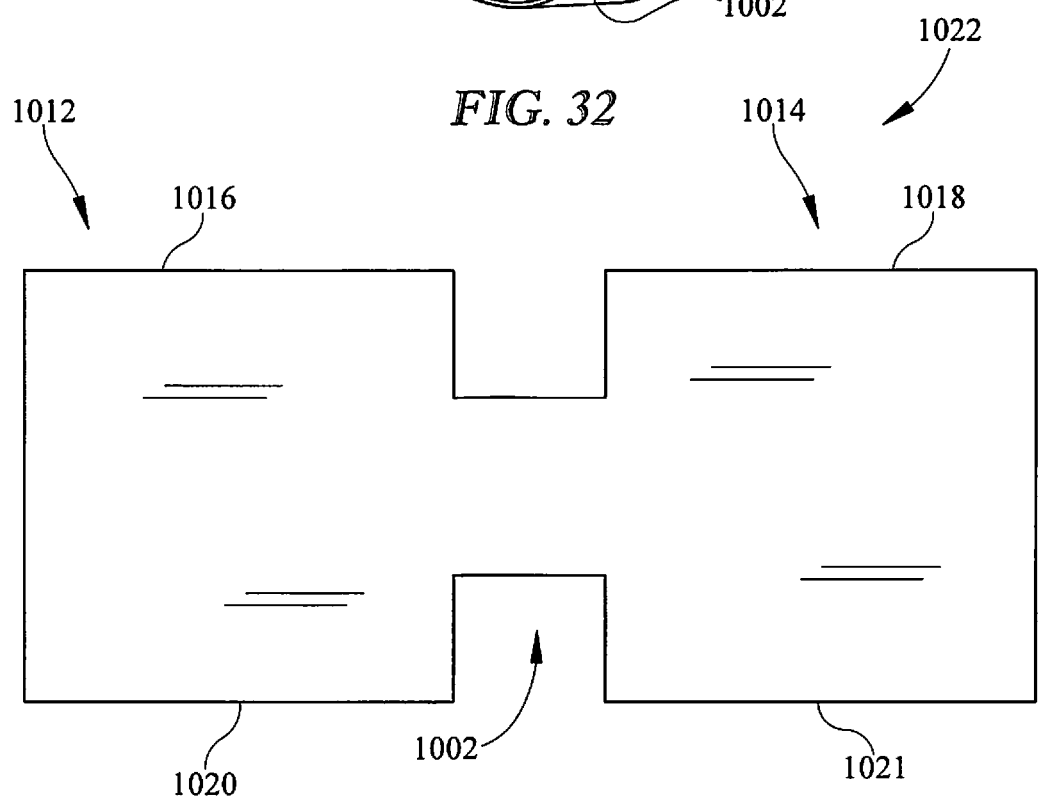
Figure 34:
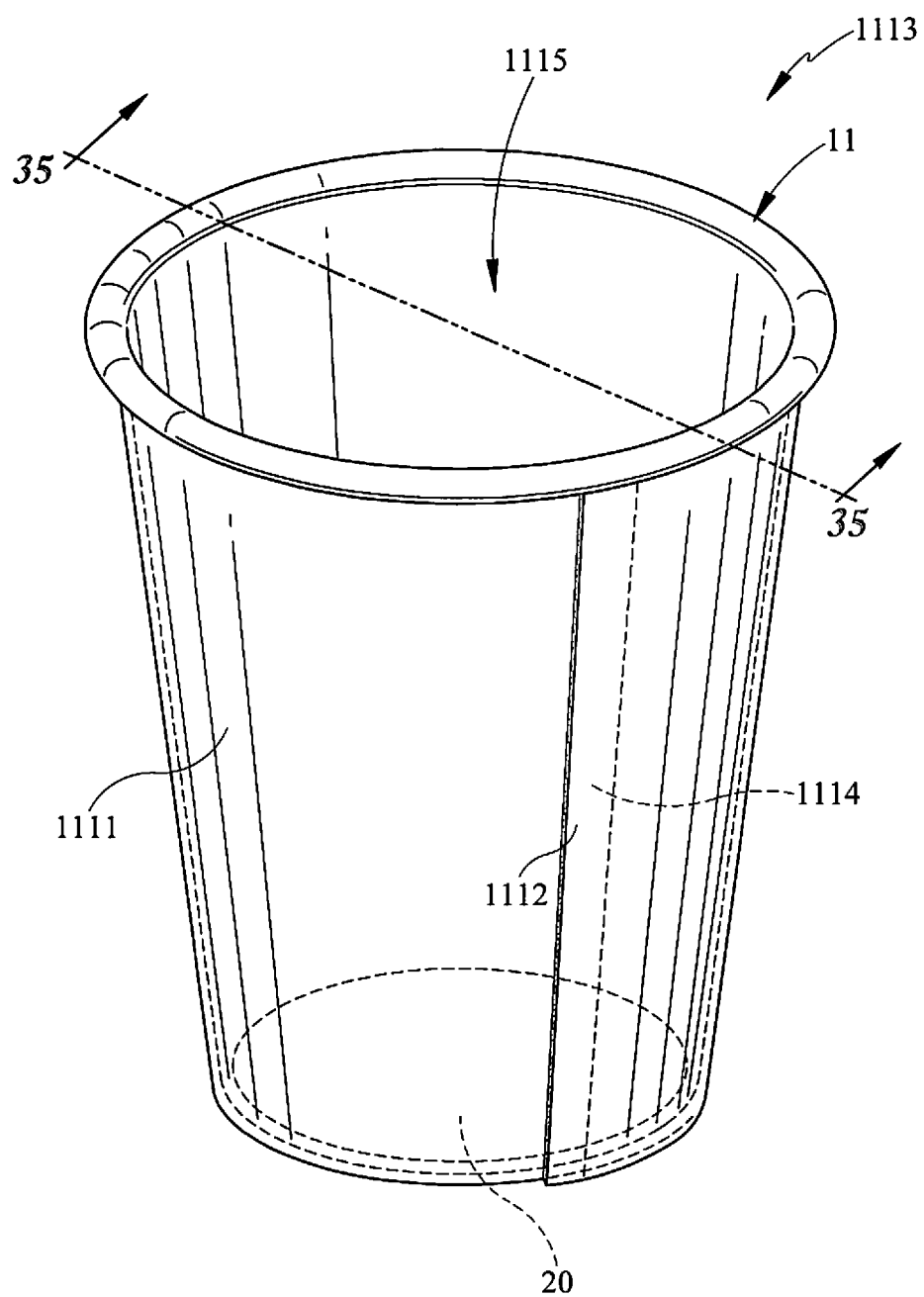
Figure 35:
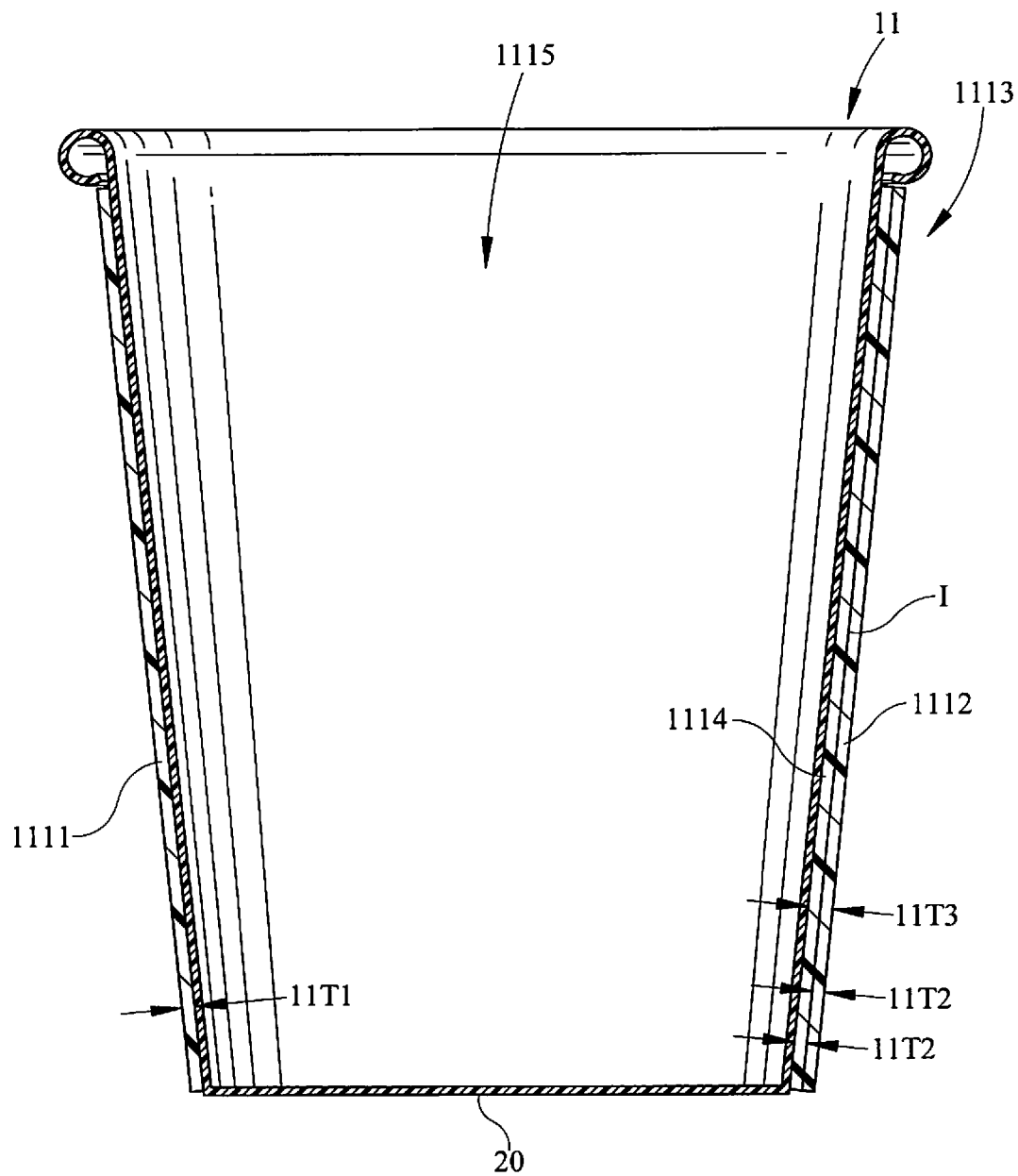

FIG. 3B is a sectional view taken along line 3B-3B of FIG. 1 showing that the insulative sleeve is formed from an insulative cellular non-aromatic polymeric material that has been plastically deformed in a localized region along overlapping first and second upright tabs included in the sleeve to provide a bridge having a reduced thickness that is similar to a thickness of the rest of the insulative sleeve;

FIG. 4 is a perspective and diagrammatic view of a sleeve-forming process in accordance with the present disclosure showing that the sleeve-forming process includes the steps of loading a laminated roll to provide a sheet including insulative cellular non-aromatic polymeric material, plastically deforming the sheet to form a deformed sheet, cutting the deformed sheet to form sleeve blanks and scrap, collecting scrap, and accumulating the sleeve blanks to form sleeve-blank stacks, storing sleeve-blank stacks for transportation or storage, loading the sleeve blanks, heating the sleeve blank, wrapping the sleeve blank around a mandrel of a sleeve-forming machine, forming the insulative sleeve by overlapping and joining the upright tabs included in the sleeve blank, accumulating insulative sleeves to form stacks of insulative sleeves, and storing stacks of insulative sleeves for use at a later time in an illustrative container-forming process suggested in FIG. 5;

FIG. 5 is a perspective and diagrammatic view of the container-forming process suggested in FIG. 4 showing that that the container-forming process includes the steps of loading stacks of cups into a container-forming machine, loading stacks of insulative sleeves into the container-forming machine, positioning the insulative sleeve on the cup, coupling the insulative sleeve to the cup to form an insulative container, and inspecting the insulative container for defects;

FIG. 6 is a perspective view of another embodiment of an insulative container in accordance with the present disclosure showing that the insulative container includes the cup and an insulative sleeve that is coupled to the side wall of the cup and arranged to extend from the rolled brim to the floor of the cup;

FIG. 7 is a partial sectional view taken along line 8-8 of FIG. 6;

FIG. 8 is a partial sectional view taken along line 8-8 of FIG. 6 showing that the insulative sleeve extends between the rolled brim and the floor of the container and that the insulative sleeve includes upright inner and outer tabs (visible on the right side of FIG. 8) arranged to overlap one another and form a bridge along a right side of the insulative container and a fence extending around the side wall and interconnecting the upright inner and outer tabs;

FIG. 8A is an enlarged dead section view of a bridge in accordance with the present disclosure showing how the insulative cellular non-aromatic polymer material has been compressed in both the first and second tabs to produce a bridge having a reduced the thickness that is similar to a thickness of the side wall in the C-shaped fence opposite the bridge;

FIG. 8B is an enlarged dead section view of a portion of the C-shaped fence of FIG. 8A showing that the insulative cellular non-aromatic polymer material has not been compressed;

FIG. 8C is an enlarged dead section view of the first and second tabs prior to mating to one another to establish the bridge;

FIG. 8D is a dead section view taken along line 8'-8' of FIG. 1 (omitting the side wall of the insulative cup) and showing that the insulative sleeve includes a C-shaped fence, an upright outer tab coupled to one end of the C-shaped fence, and an upright inner tab coupled to an opposite end of the C-shaped fence and suggested that the first and second tabs are arranged to overlap one another to establish a bridge extending between the ends of the C-shaped fence to define the interior region therebetween;

FIG. 9 is a plan view of a sleeve blank used during a sleeve-forming process to form the sleeve of FIG. 6;

FIG. 10 is an exploded assembly view of the insulative container of FIG. 6 showing that the insulative container includes, from top to bottom, the cup including the rolled brim, sleeve-shaped side wall, and floor and the insulative sleeve having a height which is about equal to a height of the sleeve-shaped side wall;

FIG. 11 is a perspective view of another embodiment of an insulative sleeve in accordance with the present disclosure showing that the insulative sleeve includes a series of generally horizontal ribs formed on an inner surface of the sleeve;

FIG. 12 is a plan view of a sleeve blank used during a sleeve-forming process to form the insulative sleeve of FIG. 11;

FIG. 13 is a sectional view taken along line 13-13 of FIG. 12;

FIG. 14 is a perspective view of another embodiment of an insulative sleeve in accordance with the present disclosure showing that the insulative sleeve includes a series of generally vertical ribs formed on an inner surface of the sleeve;

FIG. 15 is a plan view of a sleeve blank used during a sleeve-forming process to form the insulative sleeve of FIG. 14;

FIG. 16 is a sectional view taken along an arc line 16-16 of FIG. 15;

FIG. 17 is a perspective view of another embodiment of an insulative sleeve in accordance with the present disclosure showing that the insulative sleeve includes a series of ribs formed on an inner surface of the insulative sleeve and arranged in a spiral to slope downwardly;

FIG. 18 is a plan view of a sleeve blank used during a sleeve-forming process to form the insulative sleeve of FIG. 17;

FIG. 19 is a sectional view taken along line 19-19 of FIG. 18;

FIG. 20 is a perspective view of another embodiment of an insulative sleeve in accordance with the present disclosure showing that the insulative sleeve includes a series of nubs formed on an inner surface of the insulative sleeve;

FIG. 21 is a plan view of a sleeve blank used during a sleeve-forming process to form the insulative sleeve of FIG. 20;

FIG. 22 is a sectional view taken along line 22-22 of FIG. 20;

FIG. 23 is a perspective view of another embodiment of an insulative sleeve in accordance with the present disclosure showing that the insulative sleeve includes a number of protruding ribs formed in the sleeve as a result of displacing portions of the sleeve;

FIG. 24 is a plan view of a sleeve blank used during a sleeve-forming process to form the insulative sleeve of FIG. 23;

FIG. 25 is a sectional view taken along line 25-25 of FIG. 23;

FIG. 26 is an enlarged portion of FIG. 25 showing that material has been displaced in the sleeve to form the protruding ribs;

FIG. 27 is a perspective view of another embodiment of an insulative sleeve in accordance with the present disclosure showing that the insulative sleeve includes a sleeve wall and a sleeve floor coupled to the sleeve wall to define a cup-receiving space therebetween;

FIG. 28 is a plan view of a sleeve blank used during a sleeve-forming process to form the insulative sleeve of FIG. 27;

FIG. 29 is a perspective view of another embodiment of an insulative sleeve in accordance with the present disclosure showing that the insulative sleeve includes a sleeve wall and a sleeve floor coupled to the sleeve wall to define a cup-receiving space therebetween;

FIG. 30 is a plan view of a sleeve-wall blank used during a sleeve-forming process to form the sleeve wall;

FIG. 31 is a plan view of a sleeve-floor blank used during the sleeve-forming process to form the sleeve floor which is coupled to the sleeve wall to establish the insulative sleeve;

FIG. 32 is a perspective view of another embodiment of an insulative sleeve in accordance with the present disclosure showing that the insulative sleeve includes a sleeve wall having a first bridge on a left side of the insulative sleeve and a second bridge opposite the first bridge on a right side of the insulative sleeve and a sleeve floor coupled to the sleeve wall to define a cup-receiving space therebetween;

FIG. 33 is a plan view of a sleeve blank used during a sleeve-forming process to form the insulative sleeve of FIG. 27 showing that the sleeve blank includes, from left to right, a first wall panel, a sleeve floor, and a second wall panel;

FIG. 34 is a perspective view of another embodiment of an insulative container in accordance with the present disclosure showing that the insulative container includes a cup and an insulative sleeve that includes a fence having a fence thickness and a bridge having a bridge thickness that is about twice the fence thickness;

FIG. 35 is a sectional view taken along line 35-35 of FIG. 34;

FIGS. 36-40 are a series of views showing another embodiment of an insulative sleeve in accordance with the present disclosure and showing assembly of the insulative sleeve in the field;

FIG. 36 is a perspective view of another embodiment of an insulative sleeve in accordance with the present disclosure showing that the insulative sleeve is in a dis-assembled state that includes a sleeve wall having first and second panels connected together by a connecting web along a fold line and a sleeve-wall retainer including an upright tab, an adhesive layer applied to the upright tab, and a release liner coupled to the adhesive layer;

FIGS. 37-40 are a series of views showing an illustrative method of applying the insulative sleeve of FIG. 36 to a cup in the field;

FIG. 37 is a perspective view showing a cup and the insulative sleeve of FIG. 36 in the disassembled state;

FIG. 38 is a view similar to FIG. 37 with the second panel of the sleeve wall folded back away from the first panel of the sleeve wall along the connecting web to expose the sleeve-wall retainer and suggesting that the release liner is peeled away from the adhesive layer to expose the adhesive layer;

FIG. 39 is a view similar to FIG. 38 showing the release liner removed from the adhesive layer and suggesting that the sleeve-wall retainer is arranged to overlap a distal end of the second panel as suggested in FIG. 40; and FIG. 40 is a view similar to FIG. 39 showing that the sleeve-wall retainer has been arranged to overlap the distal end of the second panel to cause the insulative sleeve to be established with a cup-receiving space formed therebetween.

DETAILED DESCRIPTION

Figure 2:
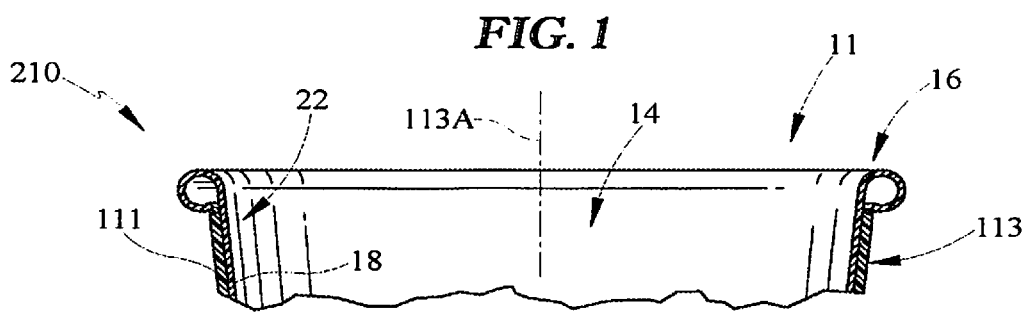
FIG. 2 is a partial sectional view taken along line 8-8 of FIG. 6 showing an upper portion of another embodiment of the insulative sleeve that is coupled to the side wall and that is shown in more detail in FIGS. 6-8.

An insulative container 110 in accordance with a first embodiment of the present disclosure is shown, for example, in FIGS. 1-3. As an example, insulative container 110 includes a cup 11 and a first embodiment of an insulative sleeve 113 as shown in FIGS. 1-3. A container-forming process 46, 47 used to make the insulative container 110 is shown in FIGS. 4 and 5. Another embodiment of an insulative container 210 in accordance with the present disclosure is illustrated in FIGS. 6-10. Other embodiments of insulative sleeves 313, 413, 513, 613, 713, 813, 913, 1013, 1113, 1213, and 1313 that are in accordance with the present disclosure are shown in FIGS. 11-36.

An insulative container 110 in accordance with the present disclosure includes a cup 11 and an insulative sleeve 113 as shown in FIGS. 1, 3, and 4. Cup 11 includes body 12 formed to include an interior region 14 and a rolled brim 16 coupled to body 12 as shown, for example, in FIG. 1. Body 12 includes a side wall 18 and a floor 20 coupled to side wall 18 to define an interior region 14 therebetween. In one illustrative example, cup 11 may be formed of polypropylene using a thermoforming process.

Insulative sleeve 113 illustratively comprises a strip 82 of insulative cellular non-aromatic polymeric material. Strip 82 of insulative cellular non-aromatic polymeric material is configured to provide means for insulating a beverage, dessert or other substance placed in interior region 14 of cup 11 while providing resistance to deformation and puncture and for providing an exterior surface that is suitable for printing graphics and other information thereon.

Insulative sleeve 113 includes a region 101 having localized plastic deformation that provides segments of insulative sleeve 113 that exhibit higher material density than neighboring segments of insulative sleeve 113 in accordance with the present disclosure is shown in FIGS. 1 and 3. As an example, insulative sleeve 113 is made using an illustrative sleeve-forming process 46 suggested in FIG. 4. Insulative container 110 is made using an illustrative container-forming process 47 using a sleeve blank 300 as shown, for example, in FIG. 5. Strip 82 of insulative cellular non-aromatic polymeric material used to form insulative sleeve 113 is shown in FIGS. 3A and 3B.

Insulative sleeve 113 includes an upright inner tab 114, an upright outer tab 112, and an upright fence 111 extending between inner and outer tabs 114, 112 as suggested in FIG. 8D. Upright inner tab 114 is configured to provide the first material segment having the higher first density in the region 101 of sleeve 113. Upright outer tab 112 is arranged to mate with upright inner tab 114 along an interface I therebetween as suggested in FIG. 8D. Upright fence 111 is arranged to interconnect upright inner and outer tabs 114, 112 and surround interior region 14. Upright fence 111 is configured to provide the second material segment having the lower second density in the region 101 insulative sleeve 113 and cooperate with upright inner and outer tabs 114, 112 to form insulative sleeve 113 as suggested in FIG. 8D. Region 101 of insulative sleeve 113 in which localized plastic deformation is enabled by the insulative cellular non-aromatic polymeric material is where upright inner and outer tabs 114, 112 overlap along interface I as suggested in FIG. 8D.

Upright fence 111 of insulative sleeve 113 is C-shaped in a horizontal cross-section and each of upright inner and outer tabs 114, 112 has an arcuate shape in a horizontal cross-section as suggested in FIG. 8D. Upright fence 111 includes an upright left side edge 111L and an upright right side edge 111R that is arranged to lie in spaced-apart confronting relation to upright left side edge 111L. Upright outer tab 112 is configured to have the higher first density and mate with upright inner tab 114 also characterized by the higher first density to establish a bridge 112, 114 arranged to interconnect upright left and right side edges 111L, 111R of upright fence 111. Bridge 112, 114 is formed of plastically deformed material having the higher first density.

As shown, for example, in FIG. 1, upright fence 111 of insulative sleeve 113 has a sleeve height H1. Cup 11 has a cup height D1. As shown in FIG. 1, sleeve height H1 is less than cup height D1.

Insulative sleeve 113 includes a pair of tabs 114, 112 that mate to provide insulative sleeve 113 with a frustoconical shape in the illustrative embodiment shown in FIGS. 8A, 8C, and 8D. Upright inner tab 114 includes an inner surface 114i bounding a portion of interior region 14 and an outer surface 114o facing toward upright outer tab 112 as shown in FIGS. 8C and 8D. Upright outer tab 112 includes an inner surface 112i facing toward interior region 14 and mating with outer surface 114o of upright inner tab 114 to define the interface I between upright inner and outer tabs 114, 112. Upright outer tab 112 further includes an outer face 112o facing away from upright inner tab 114. Each of inner and outer surfaces of upright inner and outer tabs 114, 112 has an arcuate shape in a horizontal cross-section as suggested in FIG. 8C and subtends an acute angle of less than 20° as suggested in FIG. 8D.

Upright fence 111 is C-shaped in a horizontal cross-section and each of upright inner and outer tabs 114, 112 has an arcuate shape in a horizontal cross-section as suggested in FIG. 8D. Upright fence 111 includes an upright left side edge 111L and an upright right side edge 111R that is arranged to lie in spaced-apart confronting relation to upright left side edge 111L in FIG. 8C. Upright outer tab 112 is configured to have the higher first density and mate with upright inner tab 114 also characterized by the higher first density to establish a bridge 112, 114 arranged to interconnect upright left and right side edges 111L, 111R of upright fence 111. Bridge 112, 114 is formed of plastically deformed material having the higher first density.

Upright fence 111 has an inner surface 111i bounding a portion of interior region 14 and an outer surface 111o facing away from interior region 14 and surrounding inner surface 111i of upright fence 111 as shown, or example, in FIG. 8D. Outer surface 111o cooperates with inner surface 111i of upright fence 111 to define a first thickness T1 therebetween. Upright inner tab 114 includes an inner surface 114i bounding a portion of interior region 14 and an outer surface 114o facing toward upright outer tab 112. Upright outer tab 112 includes an inner surface 112i facing toward interior region 14 and mating with outer surface 114o of upright inner tab 114 to define the interface I between upright inner and outer tabs 114, 112. Upright outer tab 112 further includes an outer face 112o facing away from upright inner tab 114. Inner and outer surfaces of upright inner tab 114 cooperate to define a second thickness T2I therebetween that is less than the first thickness T1. Inner and outer surfaces of upright outer tab 112 cooperate to define a third thickness T2O that is less than the first thickness T1.

Insulative sleeve 113 is made from a strip 82 of insulative cellular non-aromatic polymeric material. Insulative cellular non-aromatic polymeric material comprises, for example, a polypropylene base resin having a high melt strength, one or both of a polypropylene copolymer and homopolymer resin, and one or more cell-forming agents. As an example, cell-forming agents may include a primary nucleation agent, a secondary nucleation agent, and a blowing agent defined by gas means for expanding the resins and to reduce density. In one example, the gas means comprises carbon dioxide. In another example, the base resin comprises broadly distributed molecular weight polypropylene characterized by a distribution that is unimodal and not bimodal. Reference is hereby made to U.S. application Ser. No. 13/491,327 filed Jun. 7, 2012 and titled POLYMERIC MATERIAL FOR AN INSULATIVE CONTAINER for disclosure relating to such insulative cellular non-aromatic polymeric material, which application is hereby incorporated in its entirety herein.

An insulating sleeve in accordance with the present disclosure may optionally include, as shown in FIGS. 11-26, vertical, horizontal, spiral or other configuration of ribs or rib segments, hoops, bumps, nubs, or other projections, or grooves, slots, channels, depressions or the like on the inner surface of the sleeve that creates an air gap between side wall 18 of cup 11 and the insulating sleeve. This air gap forms an insulating barrier to minimize transfer of heat from a hot beverage through cup 11 and/or the insulating sleeve to a user's hand (and, conversely, transfer of heat from a user's hand through insulative sleeve 113 and side wall 18 to the beverage). As shown in FIGS. 4 and 5, insulative container 110 is formed in an illustrative container-forming process 46, 47.

As shown in FIGS. 2 and 3, insulative sleeve 113 is formed during sleeve-forming process 46 (see FIG. 4). Upright fence 111 has a first thickness T1 (see FIG. 8) and first and second upright tabs 114 (see FIG. 8), 112 (see FIG. 8) each have a second thickness T2 (see FIG. 8). As suggested in FIG. 1, second thickness T2 is about half to first thickness T1. As a result, bridge 114, 112 formed by overlapping and coupling upright tabs 114, 112 has a third thickness T3 which about equal to first thickness T1. In one exemplary embodiment the insulative sleeve 113 may be formed in the forming apparatus and coupled with cup 11. Insulative sleeve 113 may be manufactured, stored, shipped, and/or sold separately with a self-locking die cut feature. The self-locking feature may have various shapes to promote retention.

Insulative sleeve 113 is made using sleeve-forming process 46 as shown, for example, in FIG. 4. Sleeve-forming process 46 includes a laminated-roll loading step 461A, a compressing step 462A, a cutting step 463A, an accumulating sleeve blanks step 464A, a storing sleeve blanks step 465A, a loading sleeve blank step 461B, heating sleeve blanks step 462B, wrapping sleeve blanks step 463B, forming sleeve step 464B, accumulating sleeves step 465B, and storing stacks of sleeves step 466B as shown in FIG. 4.

Laminated-roll loading step 461A loads laminated roll 86 onto a cutting machine such as a die cutting machine or metal-on-metal stamping machine. As a result, laminated sheet 80 is drawn into the cutting machine for processing. Compressing step 462A compresses portions of laminated sheet 80 to form a compressed sheet. Cutting step 463A cuts compressed sheet to cause sleeve blank 300 to be cut from a laminated sheet 80. As an example, cutting step 463A and compressing step 462A may be combined such that they are performed generally at the same time on the same piece of equipment. Accumulating sleeve blanks step 464A accumulates sleeve blanks 300 into a stack 95 of sleeve blanks. Storing sleeve blanks step 465A stores stack 95 of sleeve blanks until ready for use in loading sleeve blanks step 461B. Loading sleeve blanks step 461B loads stack 95 of sleeve blanks for processing by a sleeve-forming machine. Heating sleeve blanks step 462B applies heat 102 to sleeve blank 300. Wrapping sleeve blanks step 463B wraps heated sleeve blank 300 around a mandrel included in sleeve-forming machine. Forming sleeve step 464B forms bridge 114, 112 by overlapping and compressing upright tabs 112, 114 with primary and auxiliary clamps included in sleeve-forming machine. Accumulating sleeves step 465B accumulates sleeves 113 into a stack 97 of sleeves. Storing stacks of sleeves step 466B stores stack 97 of sleeves for use in later container-forming process 47.

Insulative container 110 is made using a container-forming process 47 as shown in FIG. 5. Container-forming process 47 includes a loading cups step 471, a loading sleeves step 472, a positioning sleeve on cup step 473, a sleeve coupling step 474, and an inspecting step 475 as shown in FIG. 5. Loading containers step 471 loads container stack 124 onto a container-forming machine. Loading sleeves step 472 loads a stack 97 of sleeves onto the container-forming machine. Positioning sleeve on cup step 473 positions sleeve 113 on cup 11. Sleeve coupling step 474 couples sleeve 113 to cup 11 using heat for example to establish insulative container 110. However, sleeve 113 may be coupled by adhesive, friction fit, or any other suitable alternative. Inspecting step 475 inspects insulative container 110 for defects before passing good containers onto container-packaging stage 48 as suggested in FIG. 5.

As shown in FIG. 3A, insulative sleeve 113 is made from a sheet 80. Sheet 80 includes a skin 81 and strip 82 of insulative cellular polymeric material. Skin 81, includes, for example, a film layer 811, an ink layer 812, and an adhesive layer 810 as shown in FIG. 3A. Adhesive layer 810 is used, for example, to laminate skin 81 to strip 82 so that ink layer 812 is trapped between film layer 811 and adhesive layer 810.

In another exemplary embodiment of a sleeve-forming process, sleeve-forming process 46 is modified by not laminating a skin 81 to strip 82 of insulative cellular non-aromatic polymeric material. As a result, the skin is entirely omitted and printing may done directly on strip 82 of insulative cellular non-aromatic polymeric material.

Side wall 18 of cup 11 extends between rolled brim 16 and floor 20 as shown in FIG. 3. Side wall 18 includes a top portion 22 of body 12 that is coupled to rolled brim 16 and a bottom portion 24 arranged to interconnect floor 20 and top portion 22. Top portion 22 is arranged to extend in a downward direction toward floor 20 and is coupled to bottom portion 24 that is arranged to extend in an opposite upward direction toward rolled brim 16. Top portion 22 and rolled brim 16 cooperate to form a mouth 32 that is arranged to open into interior region 14 as shown in FIG. 1.

Insulative sleeve 113 is arranged to surround and embrace an exterior surface of a hot-beverage drink cup 11 to provide a grippable low-temperature thermal barrier that can be gripped by a consumer. Insulative sleeve 113 comprises a sheet 80 comprising insulative cellular non-aromatic polymeric material configured to provide means for enabling localized plastic deformation in sheet 80 to provide a plastically deformed first material segment having a first density located in a first portion of sheet 80 and a second material segment having a second density lower than the first density located in an adjacent second portion of sheet 80 without fracturing the insulative cellular non-aromatic polymeric material so that a predetermined insulative characteristic is maintained in sheet 80.

Sheet 80 is arranged to surround a vertical central axis 113A as suggested in FIGS. 1 and 3. Sheet 80 includes an upright inner tab 114 arranged to extend upwardly along and in spaced-apart relation to vertical central axis 113A and configured to provide the first material segment having the first density. Sheet 80 also includes an upright outer tab 112 arranged to extend upwardly along and in spaced-apart relation to vertical central axis 113A and to mate with upright inner tab 114 along an interface I therebetween, and an upright fence 111 arranged to interconnect the upright inner and outer tabs 114, 112 and surround vertical central axis 113A and configured to provide the second material segment having the second density and cooperate with upright inner and outer tabs 114, 112 to form sleeve-shaped side wall 18. Fence 111 has a substantially frustoconical shape as suggested in FIGS. 1 and 3. Each of upright inner and outer tabs 114, 112 has an arcuate shape.

Upright inner tab 114 includes an inner surface providing means for mating with a hot-beverage drink cup 11 and an outer surface facing toward upright outer tab 112 as suggested in FIGS. 8C and 8D. Upright outer tab 112 includes an inner surface mating with the outer surface of upright inner tab 114 to define the interface I between upright inner and outer tabs 114, 112. Upright outer tab 112 further includes an outer face facing away from upright inner tab 114. Each of the inner and outer surfaces of upright inner and outer tabs 114, 112 has an arcuate shape in a horizontal cross-section and subtends an acute angle of less than 20°. Upright fence 111 is C-shaped in a horizontal cross-section. Each of upright inner and outer tabs 114, 112 has an arcuate shape in a horizontal cross-section.

Upright fence 111 includes an upright left side edge 111L and an upright right side edge 111R arranged to lie in spaced-apart confronting relation to upright left side edge 111L. Upright outer tab 112 is configured to have the first density and mate with the upright inner tab to establish a bridge arranged to interconnect upright left and right side edges 111L, 111R of the upright fence and formed of plastically deformed material having the first density.

Upright fence 111 has an inner surface facing toward vertical central axis 113A and providing means for mating with a hot-beverage drink cup 11. Upright fence 111 also has an outer surface facing away from vertical central axis 113A from interior region 14 and surrounding the inner surface of upright fence 111 and cooperating with the inner surface of upright fence 111 to define a first thickness therebetween.

Upright inner tab 114 includes an inner surface facing toward vertical central axis 113A and providing means for mating with hot-beverage drink cup 11 and an outer surface facing toward upright outer tab 112. Upright outer tab 112 includes an inner surface facing toward vertical central axis 113A and mating with the outer surface of upright inner tab 114 to define interface I between upright inner and outer tabs 114, 112.

Upright outer tab 112 further includes an outer face facing away from the upright inner tab 114. The inner and outer surfaces of upright inner tab 114 cooperate to define a second thickness therebetween that is about half of the first thickness as suggested in FIG. 8D. Inner and outer surfaces of upright outer tab 112 cooperate to define a third thickness that is about half of the first thickness as suggested in FIG. 8D.

Another embodiment of an insulative container 210 in accordance with the present disclosure is shown in FIGS. 6-10. Insulative container 210 includes cup 11 and insulative sleeve 213 as shown in FIG. 6. Insulative sleeve 213 is similar to sleeve 113 except that insulative sleeve 213 has a sleeve height H1 that about equal to a cup height D1 as shown in FIG. 6.

As an example, insulative sleeve 213 is formed using sleeve blank 300 during sleeve-forming process 46 as shown, for example, in FIG. 4. Blank 300 includes a first side 302 and an opposite second side (not shown). Blank 300 has a first arcuate edge 306 that coincides with a radius 308 centered on an axis 310. A second arcuate edge 312 coincides with a radius 314 centered on axis 310. A first linear edge 316 coincides with a first ray emanating from the axis 310 and a second linear edge 318 coincides with a second ray emanating from the axis 310. When the blank 300 is wrapped such that first linear edge 316 overlaps in juxtaposition with second linear edge 318, the insulative sleeve 213 defines a frustoconical surface 320 shown in FIG. 6. The overlapped linear edges 316 and 318 may be secured in any of a number of ways including a mechanical connection created by heating the edges 316 and 318 to bonding of the insulative cellular non-aromatic polymeric material. The edges 316 and 318 may be treated with an adhesive to secure the edges 316 and 318 to one another.

In yet another embodiment of an insulative sleeve 313 formed from a sleeve blank 322, insulative sleeve 313 includes a plurality of generally horizontal ribs 328 on an inner surface 326 of an assembled insulative sleeve 313 as shown in FIGS. 11-13. Sleeve blank 322 is formed with a first thickness 322T1 and in a compressing material sheet step of a sleeve forming process, depressions 324 are formed by reducing the thickness to 322T2 as shown in FIG. 13.

Upon completion of the compressing material sheet step, blank 322 includes a number of areas of localized plastic deformation that form depression 324 with thickness 322T2 and ribs 328 which have no deformation and thickness 322T1. As shown diagramatically in FIG. 11, depressions 324 and ribs 328 cooperate to form an air gap 301 between inner surface 326 of insulative sleeve 313, an exterior surface 102 of cup 11, and a pair of neighboring ribs 328A, 328B.

Blank 322 is formed with a first linear edge 330 and a second linear edge 334. Ribs 328 are formed to abut second linear edge 334 at a first end and are spaced apart from first linear edge 330 by a distance 332 so that when first linear edge 330 overlaps second linear edge 334 during the wrapping sleeve blank step of the sleeve-forming process, the first and second ends of ribs 328 do not overlap. This reduces the amount of material that must be compressed during the wrapping sleeve blank step. Ribs 328 are positioned to engage an outer surface of a cup, such as cup 11, such that the inner surface 326 of depressions 324 are spaced apart from the outer surface of the cup to provide an air gap with only the ribs 328 engaging the outer surface of the cup. The air gap is insulative so that when a user grips an outer surface 338 of insulative sleeve 313, heat transfer from the cup to a user's hand is impeded.

In still yet another embodiment of an insulative sleeve 413 formed from a sleeve blank 422, insulative sleeve 413 includes a plurality of vertical ribs 428 on an inner surface 426 of an assembled insulative sleeve 413 as shown in FIGS. 14-16. Sleeve blank 422 is formed with a first thickness 422T1 and in a compressing material sheet step of a sleeve forming process, depressions 424 are formed by reducing the thickness to 422T2 as shown in FIG. 16. Upon completion of the compressing material sheet step, blank 422 includes a number of areas of localized plastic deformation that form depression 424 with thickness 422T2 and ribs 428 which have no deformation and thickness 422T1.

Blank 422 is formed with a first linear edge 430, a first arcuate edge 440, a second linear edge 434, and a second arcuate edge 442. Ribs 428 are formed to extend from first arcuate edge 440 to second arcuate edge 442. First linear edge 430 and second linear edge 434 each lie along a ray that emanates from a common axis that defines the center of curvature of both first arcuate edge 440 and second arcuate edge 442. Each rib 428 also lies along a ray that extends from the common axis 444. Ribs 428 are positioned to engage an outer surface of a cup, such as cup 11, such that the inner surface 426 of depressions 424 are spaced apart from the outer surface of the cup to provide an air gap with only the ribs 428 engaging the outer surface of the cup. The air gap is insulative so that when a user grips an outer surface 438 of insulative sleeve 413, heat transfer from the cup to a user's hand is impeded.

In yet another embodiment of an insulative sleeve 513 formed from a sleeve blank 522, insulative sleeve 513 includes a plurality of helical ribs 528 on an inner surface 526 of an assembled insulative sleeve 513 as shown in FIGS. 17-19. Sleeve blank 522 is extruded with a first thickness 522T1 and in a compressing material sheet step of a sleeve forming process, depressions 524 are formed by reducing the thickness to 522T2 as shown in FIG. 19. Upon completion of the compressing material sheet step, blank 522 includes a number of areas of localized plastic deformation that form depression 524 with thickness 522T2 and ribs 528 which have no deformation and thickness 522T1.

Blank 522 is formed with a first linear edge 530, a first arcuate edge 540, a second linear edge 534, and a second arcuate edge 542. Ribs 528 are formed to extend along axes that are perpendicular to second linear edge 534. Ribs 528 extend to abut either second arcuate edge 542 or first linear edge 530. Ribs 528 are positioned to engage an outer surface of a cup, such as cup 11, such that the inner surface 526 of depressions 524 are spaced apart from the outer surface of cup to provide an air gap with only the ribs 528 engaging the outer surface of cup 11. The air gap is insulative so that when a user grips an outer surface 538 of insulative sleeve 513, heat transfer from the cup to a user's hand is impeded.

In another embodiment of an insulative sleeve 613 formed from a sleeve blank 622, insulative sleeve 613 includes a plurality of nubs or protrusions 628 on an inner surface 626 of an assembled insulative sleeve 613 as shown in FIGS. 20-22. Sleeve blank 622 is extruded with a first thickness 622T1 and in a compressing material sheet step of a sleeve forming process, protrusions 628 remain after reducing the remainder of blank 622 to thickness to 622T2 as shown in FIG. 22. Upon completion of the compressing material sheet step, blank 622 includes a number of protrusions 628 which have no deformation and thickness 622T1.

Blank 622 is formed with a first linear edge 630, a first arcuate edge 640, a second linear edge 634, and a second arcuate edge 642. Protrusions 628 are spaced in rows 624 with each row 624 lying along an arc that is parallel to the first arcuate edge 640 and second arcuate edge 642. Protrusions 628 are positioned to engage an outer surface of a cup, such as cup 11, such that the inner surface 626 of insulative sleeve 613 is spaced apart from the outer surface of the cup to provide an air gap with only the protrusions 628 engaging the outer surface of the cup. The air gap is insulative so that when a user grips an outer surface 638 of insulative sleeve 613, heat transfer from the cup to a user's hand is impeded.

In yet another embodiment of an insulative sleeve 713 formed from a sleeve blank 722, insulative sleeve 713 includes a plurality of generally horizontal ribs 728 on an inner surface 736 of an assembled insulative sleeve 713 as shown in FIGS. 23-26. Sleeve blank 722 is extruded with a first thickness 722T1 and in a displacing material sheet step of a sleeve forming process, ribs 728 are formed by displacing material. Upon completion of the displacing material sheet step, blank 722 includes a number of areas of localized plastic deformation that form ribs 728 which have thickness 722T1, but with portions of the blank 722 offset to define ribs 728. Portions of blank 722 are reduced to a thickness 722T2 due to plastic deformation and elongations as the material is displaced.

The displacing material sheet step may be performed by a thermoforming process in which blank 722 is thermoformed. As a result, thicknesses 722T1 and 722T2 are maximized so that the insulative properties of insulative sleeve 713 are maximized.

Blank 722 is formed with a first linear edge 730 and a second linear edge 734. Ribs 728 are formed to abut second linear edge 734 at a first end and are spaced apart from first linear edge 730 by a distance 732 so that when first linear edge 730 overlaps second linear edge 734 during a wrapping sleeve blank step of the sleeve forming process, the first and second ends of ribs 728 do not overlap. This reduces the amount of material that must be compressed during wrapping sleeve blank process. Ribs 728 are positioned to engage an outer surface of a cup, such as cup 11, such that the inner surface 736 of depressions 724 are spaced apart from the outer surface of the cup to provide an air gap with only the ribs 728 engaging the outer surface of the cup. The air gap is insulative so that when a user grips an outer surface 738 of insulative sleeve 713, heat transfer from the cup to a user's hand is impeded.

Another embodiment of an insulative sleeve 813 in accordance with the present disclosure is shown in FIGS. 27 and 28. Insulative sleeve 813 includes an upright sleeve wall 818 and a sleeve floor 820 as shown in FIG. 27. Sleeve blank 822 is extruded with a first thickness and in a compressing material sheet step of a sleeve forming process, a fold line 828 is formed by compressing material to a relatively thinner second thickness. Sleeve floor 820 includes a floor platform 821 and a floor-retention tab 822A that is coupled to sleeve wall 818 during sleeve forming as shown in FIG. 27. After sleeve forming, sleeve floor 820 and sleeve wall 818 cooperate to define a cup-receiving space 814 therebetween.

Still yet another embodiment of an insulative sleeve 913 in accordance with the present disclosure is shown in FIGS. 29-31. Insulative sleeve 913 includes an upright sleeve wall 918 and a sleeve floor 920 as shown in FIGS. 29-31. Sleeve-wall blank 922 and sleeve-floor blank 924 are extruded with a first thickness and in a compressing material sheet step of a sleeve forming process, fold lines 928 are formed by compressing material to a relatively thinner second thickness in sleeve-floor blank 924 as shown in FIG. 31. Sleeve floor 920 includes a floor platform 921 and four floor-retention tabs 922A, 922B, 922C, 922D that are coupled to sleeve wall 918 during sleeve forming as shown in FIG. 29. After sleeve forming, sleeve floor 920 and sleeve wall 918 cooperate to define a cup-receiving space 914 therebetween.

In another embodiment, an insulative sleeve 1013 has a generally cylindrical shape with a lower tab 1002 as shown in FIG. 32. The lower tab 1002 is used to support a cylindrical drinking vessel, such as an aluminum can, for example, while insulative sleeve 1013 is positioned on the cylindrical drinking vessel. Insulative sleeve 1013 includes an opening into which the vessel is positioned and lower tab 1002 provides a stop so that the vessel is supported on lower tab 1002 to position insulative sleeve 1013. Insulative sleeve 1013 differs from sleeves 213 and 113 in that insulative sleeve 1013 has two joints 1006 and 1008 where material is joined to form the insulative sleeve 1013.

A blank 1022 for insulative sleeve 1013 includes two generally rectangular shaped portions 1012, 1014 interconnected by lower tab 1002 as shown in FIG. 33. A first linear edge 1016 of portion 1012 mates with a first linear edge 1018 of portion 1014 and the edges are overlapped in juxtaposition so that they can be joined to form joint 1006. Similarly, a second linear edge 1020 of portion 1012 mates with a second linear edge 1021 of portion 1014 overlapped and juxtaposed therewith to form joint 1008. The joints 1006 and 1008 are formed by heating the material and positioning the edges so that the insulative cellular non-aromatic polymeric material is coupled together. In other embodiments, the joints may be formed by applying adhesive to the respective edges. In either approach, pressure may be applied to assist with the joining. In other embodiments, the joints may be formed by forming a slit along one edge and forming a tab along the opposite edge and causing the tab to be inserted into the slit and retained therein.

In other embodiments, joints 1006 and 1008 may be secured by using a hook and loop fastening system, such as VELCRO®, for example. The insulative cellular non-aromatic polymeric material has sufficient flexibility to allow the insulative sleeve 1013 to be formed as a blank in a flat condition and assembled by a consumer. Similarly, sleeves 213 and 113 may use hook and loop fastening systems in some embodiments, such that the sleeves 213 and 113 can be shipped to a consumer as flat blanks and assembled by a consumer or at a point of sale. It should be understood that insulative sleeve 1013 may be formed with various surface discontinuities, including those discussed with regard to sleeves 313, 413, 513, 613, and 713 above.

Another embodiment of an insulative sleeve 1113 in accordance with the present disclosure is shown in FIGS. 34 and 35. Insulative sleeve 1113 includes an upright inner tab 1114, an upright outer tab 1112, and an upright fence 1111 extending between inner and outer tabs 1114, 1112 as suggested in FIGS. 34 and 35. Upright inner tab 1114 is arranged to extend upwardly from floor 20 of cup 11. Upright outer tab 1112 is arranged to extend upwardly from floor 20 and to mate with upright inner tab 1114 along an interface I therebetween as suggested in FIG. 35. Upright fence 1111 is arranged to interconnect upright inner and outer tabs 1114, 1112 and surround cup-receiving space 1115.

Upright fence 1111 of insulative sleeve 1113 is C-shaped in a horizontal cross-section and each of upright inner and outer tabs 1114, 1112 has an arcuate shape in a horizontal cross-section. Upright fence 1111 has a first thickness 11T1 and first and second upright tabs 1114, 1112 each have a second thickness 11T2. As suggested in FIG. 34 and shown in FIG. 35, second thickness 11T2 is about equal to first thickness 11T1. As a result, bridge 1114, 1112 formed by overlapping and coupling upright tabs 1114, 1112 has a third thickness 11T3 which about twice first and second thicknesses 11T1, 11T2.

Another embodiment of an insulative sleeve 1213 in accordance with the present disclosure is shown in FIGS. 36-40. Insulative sleeve 1213 includes a sleeve wall 1218 and a sleeve-wall retainer 1220 as shown, for example in FIG. 36. Sleeve wall 1218 includes a first sleeve panel 1218A, a second sleeve panel 1218B spaced-apart from first sleeve panel 1218A, and a connecting web 1218C positioned to lie between and interconnect first and second sleeve panels 1218A, 1218B as shown in FIGS. 36 and 38.

Sleeve-wall retainer 1220 includes an upright tab 1220A, an adhesive layer 1220B, and a release liner 1220C as shown in FIG. 36. Upright tab 1220A is coupled to a free end of first sleeve panel 1218A opposite connecting web 1218C. Adhesive layer 1220B is placed on upright tab 1220A and release liner 1220C is placed on adhesive layer 1220B to locate adhesive layer 1220B between release liner 1220C and upright tab 1220A until assembly of insulative sleeve 1213 in the field.

In example of use, insulative sleeve 1213 may be assembled and coupled to a cup 11 in the field. As shown in FIG. 37, insulative sleeve 1213 is in a dis-assembled state in spaced-apart relation to cup 11. Second sleeve panel 1218B is folded back away from first sleeve panel 1218A about connecting web 1218C to expose sleeve retainer 1220 as suggested in FIG. 38. Release liner 1220C is pulled away from adhesive layer 1220B to expose adhesive layer 1220B as shown in FIG. 39. Upright tab 1220A and adhesive 1220B are arranged to overlap a free end of second sleeve panel 1218B to for insulative sleeve 1213 as shown in FIG. 40. Cup 11 is inserted into and coupled to insulative sleeve 1213 as suggested in FIG. 40. As an example, insulative sleeve 1213 may be coupled to cup 11 by friction interference or any other suitable method.

The insulative cellular non-aromatic polymeric material used to produce the insulative sleeves 213 and 113 and the variants of those sleeves is somewhat flexible and capable of expanding slightly under load to allow a properly sized sleeve to grip a vessel with some level of bias.

It is within the scope of the present disclosure to form insulative sleeves 813, 913, 1013, 1113, and 1213 with various patterns, including those discussed with regard to sleeves 313, 413, 513, 613, and 713 above. The various patterns may be formed by forming localized areas of plastic deformation in each insulative sleeve. An example, the patterns may be formed by compression portions of the sleeve such that the pattern is made from uncompressed portions. As another example, the patterns may be formed by compressing portions of the sleeve such that the pattern is made from the compressed portions. In still yet another example, the patterns may be formed by deforming portions of the sleeve so that thicknesses throughout the sleeve are maximized. In yet another example, combinations of deformation and compression may be used.

The insulative sleeve as described hereinabove provides the cup with strength and insulation. A feature of the thermoformed cup with an insulative sleeve of the present disclosure is that the thermoformed cup is seamless, yet the insulating sleeve provides desired strength, insulation, and a printable surface. The thermoformed cup has a brim without a seam, thereby providing a lid seal which reduces potential leakage compared to expanded polystyrene cups (which have seams). Another feature of the thermoformed cup and insulative sleeve of the present disclosure is that the desired strength and insulation levels are attained, but the cup side walls have a desirable level of puncture resistance. The present disclosure also provides for an insulative sleeve which can be provided separate from the cup.

The insulative sleeve made of insulative cellular non-aromatic polymeric material as described in the present disclosure can also be used or adapted for use with structures other than containers. As an example, the insulative cellular non-aromatic polymeric material may used as, but not limited to, a window sill seal, pipe wrap, or other applications where a low density, light weight, thin, material with good insulation is desired.

In an alternative exemplary embodiment, the cup, base, or body may be made of a material other than a thermoformed material. As example, the cup, base, or body may be made of an injection molded material or any other suitable alternative.

An insulative cellular non-aromatic polymeric material produced in accordance with the present disclosure can be formed to produce an insulative sleeve. As an example, the insulative cellular non-aromatic polymeric material comprises a polypropylene base resin having a high melt strength, a polypropylene copolymer or homopolymer (or both), and cell-forming agents including at least one nucleating agent and a blowing agent such as carbon dioxide. As a further example, the insulative cellular non-aromatic polymeric material further comprises a slip agent. The polypropylene base resin has a broadly distributed unimodal (not bimodal) molecular weight distribution.

A material-forming process uses a polypropylene-based formulation in accordance with the present disclosure to produce a strip of insulative cellular non-aromatic polymeric material. Formulation is heated and extruded in two stages to produce a tubular extrudate that can be slit to provide strip of insulative cellular non-aromatic polymeric material. A blowing agent in the form of a liquified inert gas is introduced into a molten resin in the first extrusion zone.

One aspect of the present disclosure provides a formulation for manufacturing an insulative cellular non-aromatic polymeric material. As referred to herein, an insulative cellular non-aromatic polymeric material refers to an extruded structure having cells formed therein and has desirable insulative properties at given thicknesses. Another aspect of the present disclosure provides a resin material for manufacturing an extruded structure of insulative cellular non-aromatic polymeric material. Still another aspect of the present disclosure provides an extrudate comprising an insulative cellular non-aromatic polymeric material. Yet another aspect of the present disclosure provides a structure of material formed from an insulative cellular non-aromatic polymeric material. A further aspect of the present disclosure provides a container formed from an insulative cellular non-aromatic polymeric material.

In exemplary embodiments, a formulation includes at least one polymeric material. In one exemplary embodiment a primary or base polymer comprises a high melt strength polypropylene that has long chain branching. Long chain branching occurs by the replacement of a substituent, e.g., a hydrogen atom, on a monomer subunit, by another covalently bonded chain of that polymer, or, in the case of a graft copolymer, by a chain of another type. For example, chain transfer reactions during polymerization could cause branching of the polymer. Long chain branching is branching with side polymer chain lengths longer than the average critical entanglement distance of a linear polymer chain. Long chain branching is generally understood to include polymer chains with at least 20 carbon atoms depending on specific monomer structure used for polymerization. Another example of branching is by crosslinking of the polymer after polymerization is complete. Some long chain branch polymers are formed without crosslinking. Polymer chain branching can have a significant impact on material properties. Final selection of a polypropylene material may take into account the properties of the end material, the additional materials needed during formulation, as well as the conditions during the extrusion process. In exemplary embodiments high melt strength polypropylenes may be materials that can hold a gas (as discussed hereinbelow), produce desirable cell size, have desirable surface smoothness, and have an acceptable odor level (if any).

One illustrative example of a suitable polypropylene base resin is DAPLOY™ WB140 homopolymer (available from Borealis A/S), a high melt strength structural isomeric modified polypropylene homopolymer (melt strength=36 cN, as tested per ISO 16790 which is incorporated by reference herein, melting temperature=325.4° F. (163° C.) using ISO 11357, which is incorporated by reference herein).

Borealis DAPLOY™ WB140 properties (as described in a Borealis product brochure):

| Property | Typical Value | Unit | Test Method |
| --- | --- | --- | --- |
| Melt Flow Rate (230/2.16) | 2.1 | g/10 min | ISO 1133 |
| Flexural Modulus | 1900 | MPa | ISO 178 |
| Tensile Strength at Yield | 40 | MPa | ISO 527-2 |
| Elongation at Yield | 6 | % | ISO 527-2 |
| Tensile Modulus | 2000 | MPa | ISO 527-2 |
| Charpy impact strength, notched (+23° C.) | 3.0 | kJ/m$^2$ | ISO 179/leA |
| Charpy impact strength, notched (−20° C.) | 1.0 | kJ/m$^2$ | ISO 179/leA |
| Heat Deflection Temperature A (at 1.8 MPa load) | 60 | ° C. | ISO 75-2 Method A |
| Heat Deflection Temperature B (at 0.46 MPa load) | 110 | ° C. | ISO 75-2 Method B |

Other polypropylene polymers having suitable melt strength, branching, and melting temperature may also be used. Several base resins may be used and mixed together.

In certain exemplary embodiments, a secondary polymer may be used with the base polymer. The secondary polymer may be, for example, a polymer with sufficient crystallinity. In exemplary embodiments the secondary polymer may be at least one crystalline polypropylene homopolymer, an impact copolymer, mixtures thereof or the like. One illustrative example is a high crystalline polypropylene homopolymer, available as F020HC from Braskem. Another illustrative example is a polymer commercially available as PRO-FAX SC204™ (available from LyndellBasell Industries Holdings, B.V.). Another illustrative example include is Homo PP-INSPIRE 222, available from Braskem. In one aspect the polypropylene may have a high degree of crystallinity, i.e., the content of the crystalline phase exceeds 51% (as tested using differential scanning calorimetry) at 10° C./min cooling rate. In exemplary embodiments several different secondary polymers may be used and mixed together.

In exemplary embodiments, the secondary polymer may be or may include polyethylene. In exemplary embodiments, the secondary polymer may include low density polyethylene, linear low density polyethylene, high density polyethylene, ethylene-vinyl acetate copolymers, ethylene-ethylacrylate copolymers, ethylene-acrylic acid copolymers, mixtures of at least two of the foregoing and the like. The use of non-polypropylene materials may affect recyclability, insulation, microwavability, impact resistance, or other properties, as discussed further hereinbelow.

One or more nucleating agents are used to provide and control nucleation sites to promote formation of cells, bubbles, or voids in the molten resin during the extrusion process. Nucleating agent means a chemical or physical material that provides sites for cells to form in a molten resin mixture. Nucleating agents may be physical agents or chemical agents. Suitable physical nucleating agents have desirable particle size, aspect ratio, and top-cut properties. Examples include, but are not limited to, talc, $CaCO_3$, mica, and mixtures of at least two of the foregoing. The nucleating agent may be blended with the polymer resin formulation that is introduced into the hopper. Alternatively, the nucleating agent may be added to the molten resin mixture in the extruder. When the chemical reaction temperature is reached the nucleating agent acts to enable formation of bubbles that create cells in the molten resin. An illustrative example of a chemical blowing agent is citric acid or a citric acid-based material. After decomposition, the chemical blowing agent forms small gas cells which further serve as nucleation sites for larger cell growth from a physical or other types of blowing agents. One representative example is Hydrocerol™ CF-40E™ (available from Clamant Corporation), which contains citric acid and a crystal nucleating agent. In illustrative embodiments one or more catalysts or other reactants may be added to accelerate or facilitate the formation of cells.

In certain exemplary embodiments, one or more blowing agents may be incorporated. Blowing agent means a physical or a chemical material (or combination of materials) that acts to expand nucleation sites. Nucleating agents and blowing agents may work together. The blowing agent acts to reduce density by forming cells in the molten resin. The blowing agent may be added to the molten resin mixture in the extruder. Representative examples of physical blowing agents include, but are not limited to, carbon dioxide, nitrogen, helium, argon, air, pentane, butane, or other alkane mixtures of the foregoing and the like. In certain exemplary embodiments, a processing aid may be employed that enhances the solubility of the physical blowing agent. Alternatively, the physical blowing agent may be a hydrofluorocarbon, such as 1,1,1,2-tetrafluoroethane, also known as R134a, or other haloalkane refrigerant. Selection of the blowing agent may be made to take environmental impact into consideration.

In exemplary embodiments, physical blowing agents are typically gases that are introduced as liquids under pressure into the molten resin via a port in the extruder. As the molten resin passes through the extruder and the die head, the pressure drops causing the physical blowing agent to change phase from a liquid to a gas, thereby creating cells in the extruded resin. Excess gas blows off after extrusion with the remaining gas being trapped in the cells in the extrudate.

Chemical blowing agents are materials that degrade or react to produce a gas. Chemical blowing agents may be endothermic or exothermic. Chemical blowing agents typically degrade at a certain temperature to decompose and release gas. In one aspect the chemical blowing agent may be one or more materials selected from the group consisting of azodicarbonamide; azodiisobutyro-nitrile; benzenesulfonhydrazide; 4,4-oxybenzene sulfonylsemicarbazide; p-toluene sulfonyl semi-carbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis (benzene sulfonyl hydrazide); diphenyl sulfone-3,3'-disulfonyl hydrazide; calcium azide; 4,4'-diphenyl disulfonyl azide; and p-toluene sulfonyl azide.

In one aspect of the present disclosure, where a chemical blowing agent is used, the chemical blowing agent may be introduced into the resin formulation that is added to the hopper.

In one aspect of the present disclosure, the blowing agent may be a decomposable material that forms a gas upon decomposition. A representative example of such a material is citric acid or a citric-acid based material. In one exemplary aspect of the present disclosure it may be possible to use a mixture of physical and chemical blowing agents.

In one aspect of the present disclosure, at least one slip agent may be incorporated into the resin mixture to aid in increasing production rates. Slip agent (also known as a process aid) is a term used to describe a general class of materials which are added to a resin mixture and provide surface lubrication to the polymer during and after conversion. Slip agents may also reduce or eliminate die drool. Representative examples of slip agent materials include amides of fats or fatty acids, such as, but not limited to, erucamide and oleamide. In one exemplary aspect, amides from oleyl (single unsaturated C-18) through erucyl (C-22 single unsaturated) may be used. Other representative examples of slip agent materials include low molecular weight amides and fluoroelastomers. Combinations of two or more slip agents can be used. Slip agents may be provided in a master batch pellet form and blended with the resin formulation.

One or more additional components and additives optionally may be incorporated, such as, but not limited to, impact modifiers, colorants (such as, but not limited to, titanium dioxide), and compound regrind.

The polymer resins may be blended with any additional desired components and melted to form a resin formulation mixture.

In addition to surface topography and morphology, another factor that was found to be beneficial to obtain a high quality insulative cup free of creases was the anisotropy of the insulative cellular non-aromatic polymeric strip. Aspect ratio is the ratio of the major axis to the minor axis of the cell. As confirmed by microscopy, in one exemplary embodiment the average cell dimensions in a machine direction (machine or along the web direction) of an extruded strip of insulative cellular non-aromatic polymeric material was about 0.0362 inches (0.92 mm) in width by about 0.0106 inches (0.27 mm) in height. As a result, a machine direction cell size aspect ratio is about 3.5. The average cell dimensions in a cross direction (cross-web or transverse direction) was about 0.0205 inches (0.52 mm) in width and about 0.0106 inches (0.27 mm) in height. As a result, a cross-direction aspect ratio is 1.94. In one exemplary embodiment, it was found that for the strip to withstand compressive force during forming, one desirable average aspect ratio of the cells was between about 1.0 and about 3.0. In one exemplary embodiment one desirable average aspect ratio of the cells was between about 1.0 and about 2.0.

The ratio of machine direction to cross direction cell length is used as a measure of anisotropy of the extruded strip. In exemplary embodiments, a strip of insulative cellular non-aromatic polymeric material may be bi-axially oriented, with a coefficient of anisotropy ranging between about 1.5 and about 3. In one exemplary embodiment, the coefficient of anisotropy was about 1.8.

If the circumference of the cup is aligned with machine direction of extruded strip with a cell aspect ratio exceeding about 3.0, deep creases with depth exceeding about 200 microns are typically formed on inside surface of the cup making it unusable. Unexpectedly, it was found, in one exemplary embodiment, that if the circumference of the cup was aligned in the cross direction of extruded strip, which can be characterized by cell aspect ratio below about 2.0, no deep creases were formed inside of the cup, indicating that the cross direction of extruded strip was more resistant to compression forces during cup formation.

One possible reason for greater compressibility of an extruded strip with cells having aspect ratio below about 2.0 in the direction of cup circumference, such as in the cross direction, could be due to lower stress concentration for cells with a larger radius. Another possible reason may be that the higher aspect ratio of cells might mean a higher slenderness ratio of the cell wall, which is inversely proportional to buckling strength. Folding of the strip into wrinkles in the compression mode could be approximated as buckling of cell walls. For cell walls with longer length, the slenderness ratio (length to diameter) may be higher. Yet another possible factor in relieving compression stress might be a more favorable polymer chain packing in cell walls in the cross direction allowing polymer chain re-arrangements under compression force. Polymer chains are expected to be preferably oriented and more tightly packed in machine direction 67.

In exemplary embodiments, the combination of alignment of the formed cup circumference along the direction of the extruded strip where cell aspect ratio is below about 2.0. As a result, the surface of extruded strip with crystal domain size below about 100 angstroms facing inside the cup may provide favorable results of achieving a desirable surface topography with imperfections less than about 5 microns deep.

In one aspect of the present disclosure, the polypropylene resin (either the base or the combined base and secondary resin) may have a density in a range of about 0.01 g/cm$^3$ to about 0.19 g/cm$^3$. In one exemplary embodiment, the density may be in a range of about 0.05 g/cm$^3$ to about 0.19 g/cm$^3$. In one exemplary embodiment, the density may be in a range of about 0.1 g/cm$^3$ to about 0.185 g/cm$^3$.

In an alternative exemplary embodiment, instead of polypropylene as the primary polymer, a polylactic acid material may be used, such as, but not limited to, a polyactic acid material derived from a food-based material, for example, corn starch. In one exemplary embodiment, polyethylene may be used as the primary polymer.

In one exemplary aspect of the present disclosure, one formulation for a material useful in the formation of an insulative cellular non-aromatic polymeric material includes the following: at least one primary resin comprising a high melt strength long chain branched polypropylene, at least one secondary resin comprising a high crystalline polypropylene homopolymer or an impact copolymer, at least one nucleating agent, at least one blowing agent, and at least one slip agent. Optionally, a colorant may be incorporated.

The formulation may be introduced into an extruder via a hopper. During the extrusion process the formulation is heated and melted to form a molten resin mixture. In exemplary embodiments, at least one physical blowing agent is introduced into the molten resin mixture via one or more ports in the extruder. The molten resin mixture and gas is then extruded through a die.

In another exemplary embodiment, the formulation may contain both at least one chemical blowing agent and at least one physical blowing agent.

Material-forming process extrudes a non-aromatic polymeric material into a sheet or strip of insulative cellular non-aromatic polymeric material. As an example, material-forming process uses a tandem-extrusion technique in which a first extruder and a second extruder cooperate to extrude strip of insulative cellular non-aromatic polymeric material.

A formulation of insulative cellular non-aromatic polymeric material is loaded into a hopper coupled to first extruder. The formulation may be in pellet, granular flake, powder, or other suitable form. Formulation of insulative cellular non-aromatic polymeric material is moved from hopper by a screw included in first extruder. Formulation is transformed into a molten resin in a first extrusion zone of first extruder by application of heat and pressure from screw. In exemplary embodiments a physical blowing agent may be introduced and mixed into molten resin after molten resin is established. In exemplary embodiments, as discussed further herein, the physical blowing agent may be a gas introduced as a pressurized liquid via a port and mixed with molten resin to form a molten extrusion resin mixture.

Extrusion resin mixture is conveyed by screw into a second extrusion zone included in second extruder. There, extrusion resin mixture is further processed by second extruder before being expelled through an extrusion die coupled to an end of second extruder to form an extrudate. As extrusion resin mixture passes through extrusion die, gas comes out of solution in extrusion resin mixture and begins to form cells and expand so that extrudate is established. The extrudate may be formed by an annular extrusion die to form a tubular extrudate. A slitter then cuts extrudate to establish a sheet or strip of insulative cellular non-aromatic polymeric material.

Extrudate means the material that exits an extrusion die. The extrudate material may be in a form such as, but not limited to, a sheet, strip, tube, thread, pellet, granule or other structure that is the result of extrusion of a polymer-based formulation as described herein through an extruder die. For the purposes of illustration only, a sheet will be referred to as a representative extrudate structure that may be formed, but is intended to include the structures discussed herein. The extrudate may be further formed into any of a variety of final products, such as, but not limited to, cups, containers, trays, wraps, wound rolls of strips of insulative cellular non-aromatic polymeric material, or the like.

A potential unexpected feature of the sheet of insulative cellular non-aromatic polymeric material formed as described herein is the high insulation value obtained at a given thickness. See, for example, Examples 1 and 2 below.

A potential feature of a sleeve formed of insulative cellular non-aromatic polymeric material according to exemplary embodiments of the present disclosure is that the sleeve has low material loss. Furthermore, the material of the present disclosure may have markedly low off-gassing when subjected to heat from a conventional kitchen-type microwave oven for periods of time up to several minutes.

Another potential feature of a sleeve formed of the insulative cellular non-aromatic polymeric material according to the present disclosure is that the sleeve can be placed in and go through a conventional residential or commercial dishwasher cleaning cycle (top rack) without noticeable structural or material breakdown or adverse affect on material properties.

Another potential feature of an article formed of the insulative cellular non-aromatic polymeric material according to various aspects of the present disclosure is that the article can be recycled. Recyclable means that a material can be added (such as regrind) back into an extrusion or other formation process without segregation of components of the material, i.e., an article formed of the material does not have to be manipulated to remove one or more materials or components prior to re-entering the extrusion process. For example, a cup or sleeve having a printed film layer laminated to the exterior of the cup may be recyclable if one does not need to separate out the film layer prior to the cup being ground into particles. In contrast, a paper-wrapped expanded polystyrene cup may not be recyclable because the polystyrene material could not practically be used as material in forming an expanded polystyrene cup, even though the cup material may possibly be formed into another product. As a further example, a cup formed from a non-expanded polystyrene material having a layer of non-styrene printed film adhered thereto may be considered non-recyclable because it would require the segregation of the polystyrene cup material from the non-styrene film layer, which would not be desirable to introduce as part of the regrind into the extrusion process.

Recyclability of articles formed from the insulative cellular non-aromatic polymeric material of the present disclosure minimizes the amount of disposable waste created. In comparison, beaded expanded polystyrene cups that break up into beads and thus ordinarily cannot easily be reused in a manufacturing process with the same material from which the article was formed. And, paper cups that typically have an extrusion coated plastic layer or a plastic lamination for liquid resistance ordinarily cannot be recycled because the different materials (paper, adhesive, film, plastic) normally cannot be practicably separated in commercial recycling operations.

A potential feature of a cup or other article formed of material according to one aspect (a non-laminate process) of the present disclosure is that the outside (or inside or both) wall surface of the insulative cellular non-aromatic polypropylene sheet (prior to being formed into a cup or sleeve, or during formation, depending on the manufacturing process employed) can accept printing of high-resolution graphics. Conventional beaded expanded polystyrene cups have a surface which typically is not smooth enough to accept printing other than low-resolution graphics. Similarly, known uncoated paper cups also typically do not have a smooth enough surface for such high-resolution graphics. Paper cups can be coated to have the desired surface finish and can achieve high resolution. Paper has difficulty reaching insulation levels and requires a designed air gap incorporated into or associated with the cup to achieve insulation, such as a sleeve slid onto and over a portion of the cup. Accordingly, solutions have been to use low-resolution printing, laminate to the outside wall a film which has been printed, or to have a printed sleeve (either bonded or removable) inserted over the outside wall or coat the paper to accept high resolution graphics.

A potential feature of a cup formed of the insulative cellular non-aromatic polymeric material according to one aspect of the present disclosure is that it possesses unexpected strength as measured by rigidity. Rigidity is a measurement done at room temperature and at an elevated temperature (e.g., by filling the cup with a hot liquid) and measuring the rigidity of the material. The strength of the cup material is important to reduce the potential for the cup being deformed by a user and the lid popping off or the lid or sidewall seal leaking.

A potential feature of a cup formed of the insulative cellular non-aromatic polymeric material according to the present disclosure is that the sleeve is resistant to puncture, such as by a straw, fork, spoon, finger nail, or the like, as measured by standard impact testing, as described hereinbelow. Test materials demonstrated substantially higher impact resistance when compared to a beaded expanded polystyrene cup. Accordingly, a cup formed one aspect as described herein can reduce the likelihood of puncture and leakage of hot liquid onto a user.

A feature of a cup with a compressed brim and seam formed of the material according to one aspect as described herein is that a greater number of such cups can be nested in a given sleeve length because the seam is thinner and the side wall angle can be minimized (i.e., more approaching 90° with respect to the cup bottom) while providing a sufficient air gap to permit easy de-nesting. Conventionally seam-formed cups having a seam substantially thicker than the side wall requires a greater side wall angle (and air gap) to allow for de-nesting, resulting in fewer cups being able to be nested in a given sleeve length.

A feature of a cup formed of the material according to one aspect of the present disclosure is that the brim may have a cross-section profile of less than about 0.170 inches (4.318 mm) which may be due to localized cell deformation and compression. Such a small profile is more aesthetically pleasing than a larger profile.

A feature of a cup formed of the material according to one aspect of the present disclosure is that the rolled brim diameter can be the same for cups of different volumes, enabling one lid size to be used for different cup sizes, assuming the cup rims outside diameters are the same. As a result, the number of different size lids in inventory and at the point of use may be reduced.

The material formulation may have properties that allow the sheet to be compressed without fracturing.

The insulative cellular non-aromatic polymeric material of the present disclosure may be formed into a strip which can be wrapped around other structures. For example, a strip of the material according to one aspect of the present disclosure that can be used as a wrapping material may be formed and wrapped around a pipe, conduit, or other structure to provide improved insulation. The sheet or strip may have a layer of adhesive, such as a pressure sensitive adhesive, applied to one or both faces. The strip may be wound onto a roll. Optionally, the strip may have a release liner associated therewith to make unwinding the strip from the roll easier. The polymer formulation may be adapted to provide the requisite flexibility to form a wrap or windable strip, for example, by using one or more polypropylene or other polyolefin materials that have sufficient flexibility to enable the extruded sheet to be flexible enough to be wound onto a roll. The insulative cellular non-aromatic polymeric material may be formed into a sleeve that can be inserted over a cup to provide additional insulation.

In exemplary embodiments sheets formed from the insulative cellular non-aromatic polymeric material of the present disclosure may be cut at the die or be flaked and used as a bulk insulator.

The formulation and insulative cellular non-aromatic polymeric material of the present disclosure satisfies a long-felt need for a material that can be formed into an article, such as a cup or sleeve, that includes many if not all of the features of insulative performance, ready for recyclability, puncture resistance, frangibility resistance, microwavability and other features as discussed herein. Others have failed to provide a material that achieves combinations of these features as reflected in the appended claims. This failure is a result of the features being associated with competitive design choices.

EXAMPLES

The following examples are set forth for purposes of illustration only. Parts and percentages appearing in such examples are by weight unless otherwise stipulated. All ASTM, ISO and other standard test method cited or referred to in this disclosure are incorporated by reference in their entirety.

Example 1 Formulation and Extrusion

DAPLOY™ WB140 polypropylene homopolymer (available from Borealis A/S) was used as the polypropylene base resin. F020HC, available from Braskem, a polypropylene homopolymer resin, was used as the secondary resin. The two resins were blended with: Hydrocerol™ CF-40E™ as a primary nucleation agent, talc as a secondary nucleation agent, $CO_2$ as a blowing agent, a slip agent, and titanium dioxide as a colorant. Percentages were:

79.9% Primary resin: high melt strength polypropylene Borealis WB140 HMS
15% Secondary resin: F020HC (Braskem)
0.1% Primary nucleating agent: Clariant Hyrocerol CF-40E™
2% Secondary nucleating agent: Talc
1% Colorant: $TiO_2$ PE (alternatively, PP can be used)
2% Slip agent: Ampacet™ 102823 LLDPE (linear low-density polyethylene), available from Ampacet Corporation The formulation was added to an extruder hopper. The extruder heated the formulation to form a molten resin mixture. To this mixture was added 1.1 lbs/hr $CO_2$
0.7 lbs/hr R134a The carbon dioxide with R134a was injected into the resin blend to expand the resin and reduce density. The mixture thus formed was extruded through a die head into a sheet. The sheet was then cut and formed into a cup.

Example 1 Test Results

The test results of the material formed according to Example 1 showed the material had a density of about 0.1902 g/cm$^3$ and a nominal sheet gauge of about 0.089 inches (2.2606 mm).

Microwavability

Containers produced using this material filled with 12 ounces of room temperature water were heated in a FISO Microwave Station (1200 Watts) microwave oven for 2.5 min without burning or scorching or other visible effect on the cup. In comparison, paper cups heated in the same microwave oven scorched or burned in less than 90 seconds.

Rigidity

Test Method

Samples were at 73° F. (22.8° C.) and 50% relative humidity. The Cup Stiffness/Rigidity test was conducted with a horizontal force gauge containing a load cell to measure the resisting force of the cup when exposed to the following test conditions: (a) The test location on the cup was ⅓ down from the rim of the cup; (b) testing travel distance is 0.25 inches (6.35 mm); and (c) testing travel time was 10 seconds.

Test Results

With an average wall thickness of about 0.064 inches (1.6256 mm), average density of about 0.1776 g/cm$^3$, and average cup weight of about 9.86 g, the rigidity of the material are shown below in Tables 1-2.

TABLE 1

Rigidity Test Results

| | unlidded/unfilled Rigidities (kg-F) | | |
|---|---|---|---|
| Cup # | Seam | 90° from Seam | Average |
| 1 | 0.64 | 0.654 | 0.647 |
| 2 | 0.646 | 0.672 | 0.659 |
| 3 | 0.632 | 0.642 | 0.637 |
| 4 | 0.562 | 0.608 | 0.585 |
| 5 | 0.652 | 0.596 | 0.624 |
| | | | 0.630 |

STD DEV 0.028
3sigma 0.085
High Range 0.716
Low Range 0.545

| | lidded/unfilled Rigidities (kg-F) | | |
|---|---|---|---|
| Cup # | Seam | 90° from Seam | Average |
| 6 | 0.89 | 0.83 | 0.860 |
| 7 | 0.954 | 0.904 | 0.929 |
| 8 | 0.846 | 0.808 | 0.827 |
| 9 | 0.732 | 0.826 | 0.779 |
| 10 | 0.87 | 0.792 | 0.831 |
| | | | 0.845 |
| | STD DEV 0.055 | | |
| | 3sigma 0.165 | | |
| | High Range 1.011 | | |
| | Low Range 0.680 | | |

| | unlidded/filled 200° F. Rigidities (kg-F) | | |
|---|---|---|---|
| Cup # | Seam | 90° from Seam | Average |
| 11 | 0.274 | 0.290 | 0.282 |
| 12 | 0.278 | 0.326 | 0.302 |
| 13 | 0.264 | 0.274 | 0.269 |
| 14 | 0.300 | 0.270 | 0.285 |
| 15 | 0.252 | 0.280 | 0.266 |
| | | | 0.281 |
| | STD DEV 0.014 | | |
| | 3sigma 0.043 | | |
| | High Range 0.324 | | |
| | Low Range 0.238 | | |

| | lidded/filled 200° F. Rigidities (kg-F) | | |
|---|---|---|---|
| Cup # | Seam | 90° from Seam | Average |
| 16 | 0.346 | 0.354 | 0.350 |
| 17 | 0.386 | 0.422 | 0.404 |
| 18 | 0.358 | 0.364 | 0.361 |
| 19 | 0.338 | 0.374 | 0.356 |
| 20 | 0.304 | 0.272 | 0.288 |
| | | | 0.352 |
| | STD DEV 0.042 | | |
| | 3sigma 0.125 | | |
| | High Range 0.476 | | |
| | Low Range 0.227 | | |

| | unlidded/filled ice water Rigidities (kg-F) | | |
|---|---|---|---|
| Cup # | Seam | 90° from Seam | Average |
| 21 | 0.796 | 0.730 | 0.763 |
| 22 | 0.818 | 0.826 | 0.822 |
| 23 | 0.894 | 0.760 | 0.827 |
| 24 | 0.776 | 0.844 | 0.810 |
| 25 | 0.804 | 0.714 | 0.759 |
| | | | 0.796 |
| | STD DEV 0.033 | | |
| | 3sigma 0.098 | | |
| | High Range 0.894 | | |
| | Low Range 0.698 | | |

| | lidded/filled ice water Rigidities (kg-F) | | |
|---|---|---|---|
| Cup # | Seam | 90° from Seam | Average |
| 26 | 1.044 | 0.892 | 0.968 |
| 27 | 1.146 | 1.018 | 1.082 |
| 28 | 0.988 | 1.054 | 1.021 |
| 29 | 1.012 | 1.106 | 1.059 |
| 30 | 0.826 | 1.058 | 0.942 |
| | | | 1.014 |
| | STD DEV 0.059 | | |
| | 3sigma 0.177 | | |
| | High Range 1.192 | | |
| | Low Range 0.837 | | |

TABLE 2

Summary of Rigidity Test Results

| | Unfilled Kg-F (kilograms-force) | | Hot Fill 200° F. Kg-F | | Ice Water Fill 35° F. Kg-F | | Wall Thickness | Density |
|---|---|---|---|---|---|---|---|---|
| | Unlidded | Lidded | Unlidded | Lidded | Unlidded | Lidded | Inches | g/cc |
| Test material | 0.630 | 0.845 | 0.281 | 0.352 | 0.796 | 1.014 | 0.064 | 0.1776 |

Insulation

Test Method

A typical industrial cup insulation test method as follows was used:

Attach the (cup exterior) surface temperature thermocouple to cup with glue.

Tape attached thermocouple to cup with cellophane tape so that the thermocouple is in the middle of the cup opposite the seam.

Heat water or other aqueous liquid to near boiling, such as in a microwave.

Continually stir the hot liquid with a bulb thermometer while observing the liquid temperature.

Record thermocouple temperature.

When the liquid gets to 200° F. pour into cup to near full.

Place lid on cup.

Record surface temperature for a minimum of 5 minutes.

Material thickness was about 0.089 inches (2.2606 mm). The density was about 0.1902 g/cm$^3$.

Test Results

A cup formed from the formulation noted above was used having a density of about 0.190 g/cm³ and a wall thickness of about 0.089 inches. A hot liquid at 200° F. (93.3° C.) was placed in the cup.

Test Results

The temperature measured on the outside wall of the cup was about about 140.5° F. (60.3° C.) resulting in drop of about 59.5° F. (33° C.). The maximum temperature over a five-minute period was observed to peak at about 140.5° F. (60.3° C.). The lower the temperature, the better the insulation property of the cup material as the material reduces the heat transferring from the liquid to the cup material exterior.

Frangibility

Frangibility can be defined as resistance to tear or punctures causing fragmentation.

Test Method

The Elmendorf test method described in ASTM D1922-93 was used. The radius of tear was 1.7 inches (43.18 mm).

Test Results

The test results are shown in Tables 3-4 below. The material as formed in one exemplary embodiment of the present disclosure provides superior resistance to tear forces when compared to EPS.

TABLE 3

Test Results

| Tag | Machine Direction (gram force) | | | | | | | Transverse Direction (gram force) | | | | | | |
|---|---|---|---|---|---|---|---|---|---|---|---|---|---|---|
| | Test 1 | Test 2 | Test 3 | Test 4 | Test 5 | mean | std dev. | Test 1 | Test 2 | Test 3 | Test 4 | Test 5 | mean | std dev. |
| Test Material | 288 | 262 | 288 | 258 | 315 | 282 | 23 | 232 | 213 | 178 | 205 | 232 | 212 | 23 |
| EPS | 108 | 114 | 112 | 116 | 110 | 112 | 3 | * | | | | | | |

TABLE 4

Summary of Test Results

| Tear Strength | Sample ID → | Test material cup (mean) |
|---|---|---|
| Elmendorf Tear machine direction (MD) Arm | g (gram) | 800 |
| Elmendorf Tear MD | gf (gram force) | 282 |
| Elmendorf Tear transverse direction (TD) Arm | g | 800 |
| Elmendorf Tear TD | gf | 212 |

| Tear Strength | Expanded polystyrene (mean) |
|---|---|
| Elmendorf Tear Arm | 800 |
| Elmendorf Tear | 112 |

Note that there was no data obtained for the transverse direction test for expanded polystyrene because expanded polystyrene does not have a material orientation, i.e., a machine or transverse direction, due to the manufacturing process. The range (calculated as: lower range=mean−(3× std dev); upper range=mean+(3× std dev)) for the tested material of the present disclosure was about 213 grams-force to about 351 grams-force in the machine direction and about 143 grams-force to about 281 grams-force in the transverse direction. In comparison, the range of the expanded polystyrene material tested was about 103 grams-force to about 121 grams-force.

Puncture Resistance

Test Method

Determine the force and travel needed to puncture cup sidewall and bottom. An Instron instrument is used in compression mode set to 10 inches (254 mm) per minute travel speed. The cup puncture test fixture on base of Instron is used. This fixture allows the cup to fit over a shape that fits inside the cup with a top surface that is perpendicular to the travel of the Instron tester. The one inch diameter hole of the fixture should be positioned up. The portion of the Instron that moves should be fitted with a 0.300 inch (7.62 mm) diameter punch. The punch with the hole is aligned in the test fixture. The cup is placed over the fixture and the force and travel needed to puncture the cup sidewall is recorded. The sidewall puncture test is repeated in three evenly spaced locations while not puncture testing on the seam of the cup. The bottom of the cup is tested. This should be done in the same manner as the sidewall test except no fixture is used. The cup is just placed upside down on the base of the Instron while bringing the punch down on the center of the cup bottom.

Test Results

Results of the typical sidewall puncture and the bottom puncture are shown in Table 5 below.

TABLE 5

Puncture Test Results

| Cavity # | Max Load (lbf) | Ext. @ Max Load (in) |
|---|---|---|
| Expanded polystyrene | 3.79 | 0.300 |
| tested insulative cellular non-aromatic polymeric material (No Rim) | 22.18 | 0.292 |

Slow Puncture Resistance—Straw

Test Method

The material as formed in one exemplary embodiment of the present disclosure provides superior resistance to punctures when compared to expanded polystyrene using the Slow Puncture Resistance Test Method as described in ASTM D-3763-86. The test results are shown in Tables 6-9 below.

Test Results

TABLE 6

Tested Material

| Specimen # | Peak Load g(f) | Elongation At Break (mm) |
|---|---|---|
| 1 | 13876.49 | — |
| 2 | 13684.33 | — |
| 3 | 15121.53 | — |
| 4 | 15268.95 | 17 |
| 5 | 14970.47 | 20 |
| 6 | 13049.71 | — |
| 7 | 15648.44 | 17 |
| 8 | 15352.38 | 23 |
| 9 | 18271.37 | — |

TABLE 6-continued

Tested Material

| Specimen # | Peak Load g(f) | Elongation At Break (mm) |
|---|---|---|
| 10 | 16859.29 | — |
| Mean | 15210.30 | 19 |
| Std. Dev. | 1532.83 | 3 |

TABLE 7

Comparison: Expanded Polystyrene

| Specimen # | Peak Load g(f) | Elongation At Break (mm) |
|---|---|---|
| 1 | 2936.73 | — |
| 2 | 2870.07 | 10 |
| 3 | 2572.62 | — |
| 4 | 2632.44 | — |
| 5 | 2809.70 | — |
| 6 | 2842.93 | — |
| 7 | 2654.55 | — |
| 8 | 2872.96 | — |
| 9 | 2487.63 | — |
| 10 | 2866.53 | — |
| 11 | 2803.25 | — |
| 12 | 2775.22 | — |
| 13 | 2834.28 | — |
| 14 | 2569.97 | — |
| Mean | 2752.06 | 10 |
| Std. Dev. | 140.42 | — |

TABLE 8

Paper Wrapped Expanded Polystyrene

| Specimen # | Peak Load g(f) | Elongation At Break (mm) |
|---|---|---|
| 1 | 7930.61 | — |
| 2 | 10044.30 | — |
| 3 | 9849.01 | — |
| 4 | 8711.44 | — |
| 5 | 9596.79 | — |
| 6 | 9302.99 | — |
| 7 | 10252.27 | — |
| 8 | 7785.64 | — |
| 9 | 8437.28 | — |
| 10 | 6751.98 | — |
| 11 | 9993.19 | — |
| Mean | 8968.68 | — |
| Std. Dev. | 1134.68 | — |

TABLE 9

Summary of Slow Puncture-Straw Test Results

| | Sample ID | | |
|---|---|---|---|
| | Tested insulative cellular non-aromatic polymeric material cup (mean) grams-force (gf) | Expanded polystyrene (mean) grams-force (gf) | Paper wrapped expanded polystyrene (mean) grams-force (gf) |
| Average gf: | 15210 | 2752 | 8969 |

Example 2—Formulation and Extrusion

The following formulation was used:
81.70% Borealis WB140HMS primary polypropylene
0.25% Amco A18035 PPRO talc filled concentrate
2% Ampacet 102823 Process Aid PE MB linear low density polyethylene slip agent
0.05% Hydrocerol CF-40E chemical foaming agent
1% Colortech 11933-19 colorant
15% Braskem F020HC high crystallinity homopolymer polypropylene
3.4 lbs/hour of $CO_2$ was introduced into the molten resin. Density of the strip formed ranged from about 0.155 g/cm$^3$ to about 0.182 g/cm$^3$.

The formulation was added to an extruder hopper. The extruder heated the formulation to form a molten resin mixture. To this mixture was added the $CO_2$ to expand the resin and reduce density. The mixture thus formed was extruded through a die head into a strip 82. The strip was then cut and formed into insulative cup 10.

Example 2—Test Results

In exemplary embodiments, a tube of extruded insulative cellular non-aromatic polymeric material has two surfaces that are formed under different cooling conditions when the material is extruded. One surface, which will be further referenced as the outside surface of extruded tube, is in contact with air, and does not have physical barriers restricting the expansion. The outside surface of extruded tube surface is cooled by blowing compressed air at cooling rate equal or higher than 12° F. per second. Surface on the opposite side will be referenced as inside of extruded tube. The inside of extruded tube surface is formed when the extruded tube is drawn in the web or machine direction on the metal cooling surface of the torpedo mandrel that is physically restricting the inside of extruded tube and is cooled by combination of water and compressed air at a cooling rate below 10° F. per second. In exemplary embodiments, the cooling water temperature is about 135° F. (57.22° C.). In exemplary embodiments, the cooling air temperature is about 85° F. (29.44° C.). As a result of different cooling mechanisms the outside surface of extruded tube and inside of extruded tube surfaces have different surface characteristics. It is known that the cooling rate and method affects the crystallization process of polypropylene altering its morphology (size of crystal domains) and topography (surface profile and smoothness).

An unexpected feature of exemplary embodiments of an extruded sheet as described herein is in the ability of the sheet to form a noticeably smooth, crease and wrinkle free surface, when curved to form a round article, such as cup. The surface is smooth and wrinkle free even inside the cup, where compression forces typically cause material to crush crease easily, especially for low density material with large cell size. In exemplary embodiments, the smoothness of the surface of an extruded sheet of insulative cellular non-aromatic polymeric material as detected by microscopy is such that the depth of the indentations (creases or wrinkles) naturally occurring in the outside and inside of the cup surface when it is subject to extension and compression forces during cup formation may be less than about 100 microns. In one exemplary embodiment, the smoothness may be less than about 50 microns. In one exemplary embodiment, the smoothness may be about 5 microns or less. At about 10 microns depth and less, the micro-wrinkles on cup surface are ordinarily not visible to the naked eye.

In one exemplary embodiment, an insulative cup formed from a sheet comprising a skin and a strip of insulative cellular non-aromatic polymeric material had typical creases (deep wrinkle) about 200 microns deep extending from the top to bottom of the cup. In one exemplary embodiment, an insulative cup formed from a sheet comprising a strip of insulative cellular non-aromatic polymeric material only (without a skin) had typical creases about 200 microns deep extending from top to bottom of the cup. Such creases with depths from about 100 microns to about 500 microns are typically formed when inside of extruded tube is facing inside of the cup in a compression mode. Creases and deep wrinkles may present a problem of unsatisfactory surface quality making final cups unusable or undesirable. Creases may form in instances where sheets include a skin or exclude a skin.

In exemplary embodiments, the insulative cellular non-aromatic polymeric material may be extruded as strip. However microscopy images show that two distinct layers exist within the extruded strip, namely, dull outside extruded tube layer and shiny inside extruded tube layer. The difference between the two layers is in reflectance of the surface due to the difference in crystal domain size. If a black marker is used to color the surface examined by microscope, reflectance is eliminated and the difference between the two surfaces may be minimal or undetectable.

In one exemplary embodiment, a sample strip was prepared without any skin. Black marker was used to eliminate any difference in reflectance between the layers. Images showed that the cell size and cell distribution was the same throughout the strip thickness. A crease of about 200 microns deep was seen as a fold in the surface where the cell wall collapsed under the compression forces.

Differential scanning calorimetry analysis conducted on a TA Instruments DSC 2910 in nitrogen atmosphere showed that with an increase in cooling rate, the crystallization temperature and crystallinity degree decreased for the polymer matrix material of the strip, as shown below in Table 10.

TABLE 10

| Crystallization of polymer matrix | | | | | |
|---|---|---|---|---|---|
| Crystallization temp, in ° C. | | | Crystallinity degree, in % | | |
| Slow cooling 5° C./min | 10° C./min | Fast cooling 15° C./min | Slow cooling 5° C./min | 10° C./min | Fast cooling 15° C./min |
| 135.3 | 131.5 | 129.0 | 49.2 | 48.2 | 47.4 |

| Melting (2$^{nd}$ heat) of polymer matrix (heating rate 10° C./min) after crystallization | | | | | |
|---|---|---|---|---|---|
| Melting temp, ° C. | | | Crystallinity degree, % | | |
| Slow cooling 5° C./min | 10° C./min | Fast cooling 15° C./min | Slow cooling 5° C./min | 10° C./min | Fast cooling 15° C./min |
| 162.3 | 162.1 | 161.8 | 48.7 | 47.2 | 46.9 |

Differential scanning calorimetry data demonstrates the dependence of crystallization and subsequent 2$^{nd}$ heat melting temperature and percent crystallinity on the rate of cooling during crystallization. Exemplary embodiments of a strip of insulative cellular non-aromatic polymeric material may have the melting temperature between about 160° C. (320° F.) and about 172° C. (341.6° F.), crystallization temperature between about 108° C. (226.4° F.) and about 135° C. (275° F.), and percent crystallinity between about 42% and about 62%.

In exemplary embodiments the extruded sheet as determined by differential scanning calorimetry at 10° C. per minute heating and cooling rate had a melting temperature of about 162° C. (323.6° F.), crystallization temperature of about 131° C. (267.8° F.) and crystallinity degree of about 46%.

It was found unexpectedly that the outside extrusion tube surface works favorably in a compression mode without causing appreciable creasing and therefore a cup (or other structure) may advantageously be made with the outside extrusion tube surface facing inside of the insulative cup. The difference in the resistance of the inside extrusion tube layer and outside extrusion tube layer to compression force may be due to difference in the morphology of the layers because they were crystallized at different cooling rates.

In exemplary embodiments of formation of an extruded sheet, the inside extrusion tube surface may be cooled by combination of water cooling and compressed air. The outside extrusion tube surface may be cooled by compressed air by using torpedo with circulating water and air outlet. Faster cooling rates may result in the formation of smaller size crystals. Typically, the higher cooling rate, the greater the relative amount of smaller crystals that is formed. X-Ray diffraction analysis of an exemplary extruded sheet of insulative cellular non-aromatic polymeric material was conducted on Panalytical X'pert MPD Pro diffractometer using Cu radiation at 45 KV/40 mA. It was confirmed that the outside extrusion tube surface had a crystal domain size of about 99 angstrom, while the inside extrustion tube surface had a crystal domain size of about 114 angstrom. In exemplary embodiments, an extruded strip of insulative cellular non-aromatic polymeric material may have a crystal domain size below about 200 angstroms. In exemplary embodiments, an extruded strip of insulative cellular non-aromatic polymeric material may have a crystal domain size preferably below about 115 angstroms. In exemplary embodiments, an extruded strip of insulative cellular non-aromatic polymeric material may have a crystal domain size below about 100 angstroms.

Rigidity

Test Method

The test method is the same as described for rigidity testing in Example 1.

Test Results

The rigidity test results are shown in Table 11 below.

TABLE 11

| | unlidded/filled 200° F. Rigidities (kg's) | | | lidded/filled 200° F. Rigidities (kg's) | | | | | |
|---|---|---|---|---|---|---|---|---|---|
| Sample # | Seam | 90° from Seam | Average | Seam | 90° from Seam | Average | Gram Weights | Wall Thickness | Density |
| B1 | 0.354 | 0.380 | 0.367 | 0.470 | 0.528 | 0.499 | 12.6 | 0.0744 | 0.1817 |
| B2 | 0.426 | 0.464 | 0.445 | 0.598 | 0.610 | 0.604 | 13.0 | | |
| B3 | 0.526 | 0.494 | 0.510 | 0.628 | 0.618 | 0.623 | 12.4 | | |
| B4 | 0.592 | 0.566 | 0.579 | 0.740 | 0.746 | 0.743 | 13.2 | | |
| | | | 0.475 | | | 0.617 | 12.80 | | |

Insulation

Test Method—Wall Temperature

An insulative cup formed from the formulation noted above was used having a density of about 0.18 g/cm³ and a wall thickness of about 0.074 inches (1.8796 mm). A hot liquid at 200° F. (93.3° C.) was placed in the cup.

Test Results

The temperature measured on the outside wall of the cup was about about 151° F. (66.1° C.) with a drop of about 49.0° F. (27.2° C.). The maximum temperature over a five-minute period was observed to peak at about 151° F. (66.1° C.).

Insulation testing in the form of thermal conductivity was done.

Test Method—Thermal Conductivity

This test measures bulk thermal conductivity (W/m-K), measured at ambient temperature and at 93° C. (199.4° F.). A ThermTest TPS 2500 S Thermal Constants Analyzer instrument was used, employing the test method of ISO/DIS 22007-2.2 and using the Low Density/High Insulating option. The TPS sensor #5501 0.2521 inch radius (6.403 mm radius) with Kapton® insulation was used for all measurements. A 20 second test was done, using 0.02 Watts power. Data using points 100-200 were reported.

Test Results

The test results shown in Table 12 below.

TABLE 12

| Mean Thermal Conductivity Results | | |
|---|---|---|
| Temp. (° C.) | Mean Thermal Conductivity (W/m-K) | Standard Deviation (W/m-K) |
| 21 | 0.05792 | 0.00005 |
| 93 | 0.06680 | 0.00025 |

The invention claimed is:

1. An insulative sleeve comprising
an upright inner tab arranged to extend upwardly along and in spaced-apart relation to a vertical central axis and having a plastically deformed first material segment having a first density,
an upright outer tab arranged to extend upwardly along and in spaced-apart relation to the vertical central axis and arranged to mate with the upright inner tab along an interface therebetween, and
an upright fence arranged to extend around the central axis, interconnect the upright inner tab and the upright outer tab, and having a second material segment having a second density,
and a floor coupled to the upright fence,
wherein the upright inner tab, the upright outer tab, and the upright fence comprise a first formulation of insulative cellular non-aromatic polymeric material and the floor comprises a second formulation of insulative cellular non-aromatic polymeric material.

2. The insulative sleeve of claim 1, wherein the first formulation of insulative cellular non-aromatic polymeric material comprises a polypropylene base resin, a polypropylene secondary resin, at least one nucleation agent, at least one blowing agent, and regrind from the upright inner tab, upright outer tab, and the fence made previously.

3. The insulative sleeve of claim 2, wherein the polypropylene base resin and the polypropylene secondary resin are homopolymers.

4. The insulative sleeve of claim 3, wherein polypropylene is greater than about 80% by weight of the first formulation of insulative cellular non-aromatic polymeric material.

5. The insulative sleeve of claim 3, wherein polypropylene is greater than about 95% by weight of the first formulation of insulative cellular non-aromatic polymeric material.

6. The insulative sleeve of claim 5, wherein the at least one nucleation agent is a chemical blowing agent.

7. The insulative sleeve of claim 6, wherein the second density is about 0.15 g/cm³ to about 0.19 g/cm³ and wherein the insulative cellular non-aromatic polymeric material of the upright inner tab, the upright outer tab, and the upright fence is an extrudate, and cells of the extrudate have a first dimension along a first axis and a second dimension along a second axis, the second axis is normal to the first axis, and wherein an average ratio of the first dimension to the second dimension is about 1.5 to about 3.0.

8. The insulative sleeve of claim 2, wherein the polypropylene secondary resin is a copolymer.

9. The insulative sleeve of claim 8, wherein polypropylene is greater than about 95% by weight of the first formulation of insulative cellular non-aromatic polymeric material.

10. The insulative sleeve of claim 1, wherein the second formulation of insulative cellular non-aromatic polymeric material comprises a polypropylene base resin, a polypropylene secondary resin, a physical nucleating agent, a chemical blowing agent, at least one blowing agent, and regrind from the floor made previously.

11. The insulative sleeve of claim 10, wherein the polypropylene base resin and the polypropylene secondary resin are homopolymers.

12. The insulative sleeve of claim 11, wherein polypropylene is greater than about 80% by weight of the second formulation of insulative cellular non-aromatic polymeric material.

13. The insulative sleeve of claim 11, wherein polypropylene is greater than about 95% by weight of the second formulation of insulative cellular non-aromatic polymeric material.

14. The insulative sleeve of claim 13, wherein the physical nucleating agent is talc.

15. The insulative sleeve of claim 10, wherein the polypropylene secondary resin is a copolymer.

16. The insulative sleeve of claim 15, wherein polypropylene is greater than about 95% by weight of the second formulation of insulative cellular non-aromatic polymeric material.

17. The insulative sleeve of claim 1, wherein the first formulation of insulative cellular non-aromatic polymeric material comprises a polypropylene base resin, a polypropylene secondary resin, at least one nucleation agent, at least one blowing agent, and regrind from the upright inner tab, the upright outer tab, and the upright fence previously made and wherein the second formulation of insulative cellular non-aromatic polymeric material comprises a polypropylene base resin, a polypropylene secondary resin, a physical nucleating agent, a chemical blowing agent, at least one blowing agent, and regrind from the floor made previously.

18. The insulative sleeve of claim 17, wherein the polypropylene base resin and the polypropylene secondary resin of both the first and second formulations are homopolymers.

19. The insulative sleeve of claim 18, wherein polypropylene is greater than about 95% by weight of the first and second formulations of insulative cellular non-aromatic polymeric material.

20. The insulative sleeve of claim 19, wherein the second density is about 0.15 g/cm$^3$ to about 0.19 g/cm$^3$ and wherein the insulative cellular non-aromatic polymeric material of the first formulation is an extrudate, and cells of the extrudate have a first dimension along a first axis and a second dimension along a second axis, the second axis is normal to the first axis, and wherein an average ratio of the first dimension to the second dimension is about 1.5 to about 3.0.

* * * * *